United States Patent [19]
Mano

[11] Patent Number: 6,012,151
[45] Date of Patent: Jan. 4, 2000

[54] INFORMATION PROCESSING APPARATUS AND DISTRIBUTED PROCESSING CONTROL METHOD

[75] Inventor: Kosei Mano, Kawasaki, Japan

[73] Assignee: Fujitsu Limited, Kanagawa, Japan

[21] Appl. No.: 08/839,911

[22] Filed: Apr. 21, 1997

[30] Foreign Application Priority Data

Jun. 28, 1996 [JP] Japan .................................. 8-169587

[51] Int. Cl.[7] .................................................. G06F 11/00
[52] U.S. Cl. ............................................. 714/11; 710/19
[58] Field of Search .............................. 395/182.09, 800, 395/551; 370/58; 714/4, 11, 45, 46; 710/8, 15, 17, 18, 19

[56] References Cited

U.S. PATENT DOCUMENTS

| | | | |
|---|---|---|---|
| 4,484,323 | 11/1984 | Beuscher et al. | 370/58 |
| 5,255,266 | 10/1993 | Watanabe et al. | 370/60.1 |
| 5,701,502 | 12/1997 | Baker et al. | 395/800 |
| 5,701,512 | 12/1997 | Ishizawa | 710/1 |
| 5,710,769 | 1/1998 | Anderson et al. | 370/355 |
| 5,717,950 | 2/1998 | Yamaguchi et al. | 710/8 |
| 5,742,851 | 4/1998 | Sekine | 714/43 |
| 5,764,750 | 6/1998 | Chau et al. | 379/229 |

*Primary Examiner*—Joseph E. Palys
*Assistant Examiner*—Abu Hossain
*Attorney, Agent, or Firm*—Helfgott & Karas. PC.

[57] ABSTRACT

An information processing apparatus includes at least one input and output devices each having a plurality of input and output ports, and a plurality of processors which, connected to the one or the plurality of input and output ports via a bus, process requests for processes requiring a use of the input and output ports in a distributed manner. At least one input and output device includes: an input and output port status management arrangement for maintaining an input and output port status table listing statuses of the plurality of input and output ports; a processor status management arrangement for maintaining a processor status table listing statuses of the plurality of processors; and a correspondence table management arrangement for managing correspondence between the plurality of input and output ports and pairs of active and standby processors, using a correspondence table, and each of the plurality of processors includes: a processor-specific input and output port status management controller for maintaining a processor-specific input and output port status management table listing statuses of the plurality of input and output ports to which a processor is assigned.

36 Claims, 41 Drawing Sheets

FIG. 3A

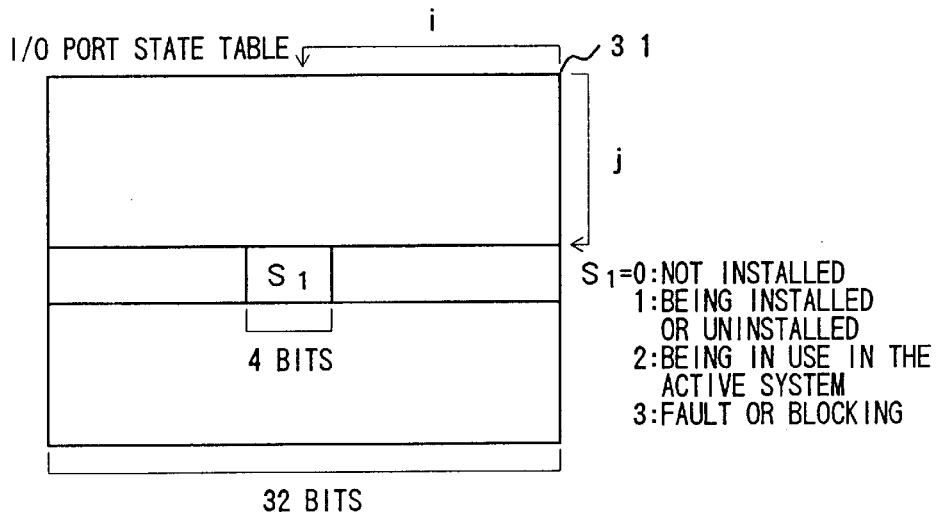

I/O PORT STATE TABLE $S_1$=0: NOT INSTALLED
1: BEING INSTALLED OR UNINSTALLED
2: BEING IN USE IN THE ACTIVE SYSTEM
3: FAULT OR BLOCKING

FIG. 3B

| EVENT \ STATUS | NOT INSTALLED 0 | BEING INSTALLED BEING UNINSTALLED 1 | BEING IN USE IN THE ACTIVE SYSTEM 2 | FAULTY BLOCKED 3 |
|---|---|---|---|---|
| INSTALLATION STARTED | 1 | — | — | — |
| INSTALLATION COMPLETED | — | 2 | — | — |
| FAULT | — | — | 3 | — |
| RECOVERY FROM A FAULT | — | — | — | 2 |
| BLOCKING | — | — | 3 | — |
| UNBLOCKING | — | — | — | 2 |
| UNINSTALLATION STARTED | — | — | — | 1 |
| UNINSTALLATION COMPLETED | — | 0 | — | — |

FIG. 4A

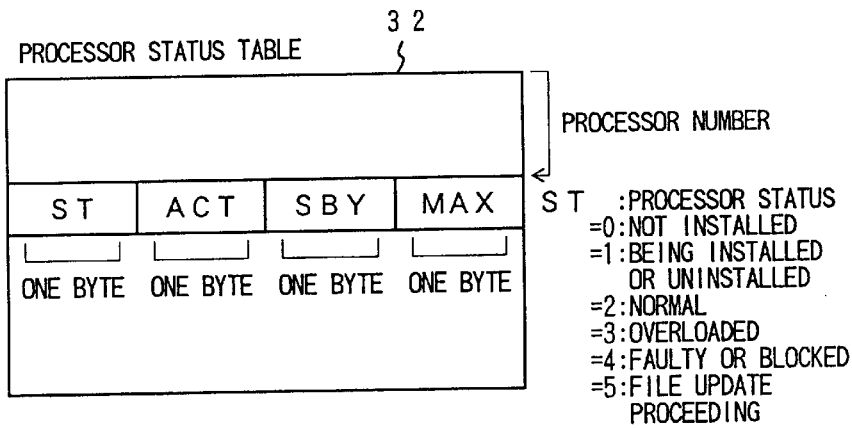

PROCESSOR STATUS TABLE  3 2

ST  ACT  SBY  MAX
ONE BYTE  ONE BYTE  ONE BYTE  ONE BYTE

PROCESSOR NUMBER

ST : PROCESSOR STATUS
=0: NOT INSTALLED
=1: BEING INSTALLED
   OR UNINSTALLED
=2: NORMAL
=3: OVERLOADED
=4: FAULTY OR BLOCKED
=5: FILE UPDATE
   PROCEEDING

FIG. 4B

| EVENT \ STATE | NOT INSTALLED 0 | BEING INSTALLED BEING UNINSTALLED 1 | NORMAL 2 | OVERLOADED 3 | FAULTY BLOCKED 4 | FILE UPDATE PROCEEDING 5 |
|---|---|---|---|---|---|---|
| INSTALLATION STARTED | 1 | — | — | — | — | — |
| INSTALLATION COMPLETED | — | 2 | — | — | — | — |
| OVERLOAD | — | — | 3 | — | — | — |
| OVERLOAD CANCELED | — | — | — | 2 | — | — |
| FAULT | — | — | 4 | 4 | — | — |
| RECOVERY FROM A FAULT | — | — | — | — | 2 | — |
| BLOCKING | — | — | 4 | 4 | — | — |
| UNBLOCKING | — | — | — | — | 2 | — |
| FILE UPDATE STARTED | — | — | 5 | — | — | — |
| FILE UPDATE COMPLETED | — | — | — | — | — | 2 |
| UNINSTALLATION STARTED | — | — | 1 | — | — | — |
| UNINSTALLATION COMPLETED | — | 0 | — | — | — | — |

FIG. 5A

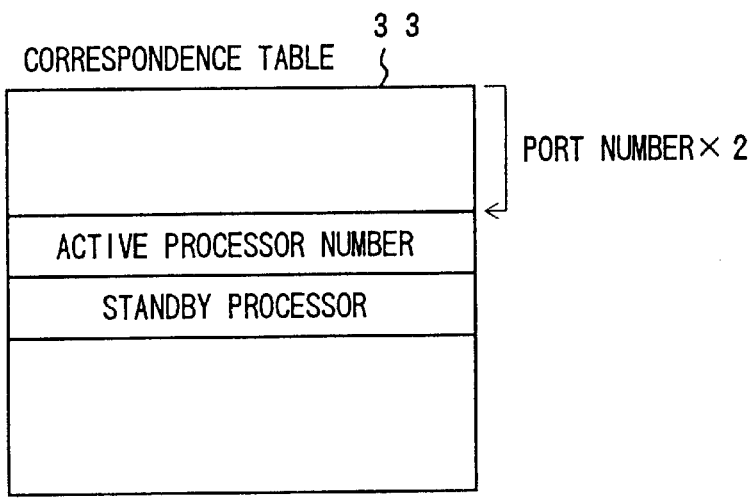

FIG. 5B

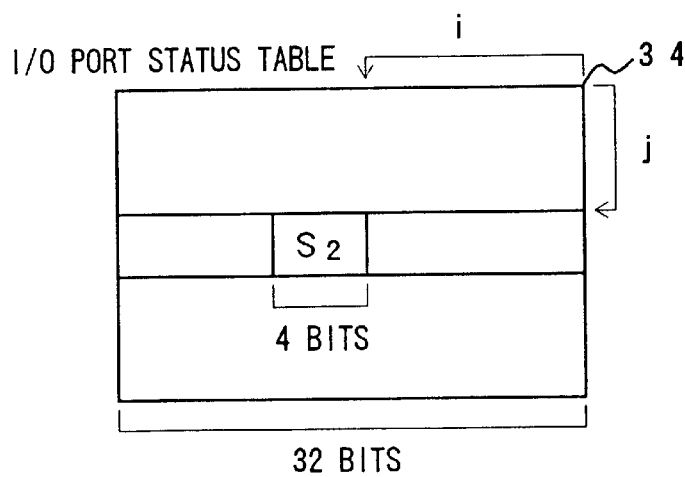

$S_2$ = 0 : NOT INSTALLED OR NOT CHARGED WITH CONTROLLING THE I/O PORT
    1 : CHARGED WITH CONTROLLING THE I/O PORT AS AN ACTIVE PROCESSOR
    2 : CHARGED WITH CONTROLLING THE I/O PORT AS A STANDBY PROCESSOR
    3 : CHARGED WITH CONTROLLING THE I/O PORT AS AN ACTIVE PROCESSOR BUT THE I/O PORT IS FAULTY OR BLOCKED
    4 : CHARGED WITH CONTROLLING THE I/O PORT AS A STANDBY PROCESSOR BUT THE I/O PORT IS FAULTY OR BLOCKED

I/O PORT NUMBER = $8 \times j + i / 4$

FIG. 7A

DATA INPUT COMMAND

| DATA LENGTH |
|---|
| DESTINATION I/O DEVICE ID NUMBER |
| TRANSMITTING PROCESSOR ID NUMBER |
| TRANSMITTED COMMAND NUMBER |
| I/O PORT NUMBER |

FIG. 7B

RESPONSE TO THE DATA INPUT COMMAND

| DATA LENGTH |
|---|
| DESTINATION PROCESSOR ID NUMBER |
| TRANSMITTING I/O DEVICE ID NUMBER |
| TRANSMITTED COMMAND NUMBER |
| I/O PORT ID NUMBER |
| INPUT RESULT |
| INPUT DATA LENGTH |
| INPUT DATA |

FIG. 8A

DATA OUTPUT COMMAND

| DATA LENGTH |
|---|
| DESTINATION I/O DEVICE ID NUMBER |
| TRANSMITTING PROCESSOR ID NUMBER |
| TRANSMITTED COMMAND NUMBER |
| I/O PORT ID NUMBER |
| OUTPUT DATA LENGTH |
| OUTPUT DATA |

FIG. 8B

RESPONSE TO THE DATA OUTPUT COMMAND

| DATA LENGTH |
|---|
| DESTINATION PROCESSOR ID NUMBER |
| TRANSMITTING I/O DEVICE ID NUMBER |
| TRANSMITTED COMMAND NUMBER |
| I/O PORT NUMBER |
| OUTPUT RESULT |

FIG. 9A

I/O PORT STATUS CHANGE INDICATION COMMAND

| DATA LENGTH |
|---|
| DESTINATION PROCESSOR ID NUMBER |
| TRANSMITTING I/O DEVICE ID NUMBER |
| TRANSMITTED COMMAND NUMBER |
| I/O PORT STATUS TABLE |

FIG. 9B

RESPONSE TO THE I/O PORT STATUS CHANGE INDICATION COMMAND

| DATA LENGTH |
|---|
| DESTINATION I/O DEVICE ID NUMBER |
| TRANSMITTING PROCESSOR ID NUMBER |
| TRANSMITTED COMMAND NUMBER |
| RECEIVED RESULT |

FIG. 10A

PROCESSOR STATUS CHANGE REPORT COMMNAD

| DATA LENGTH |
|---|
| DESTINATION I/O DEVICE ID NUMBER |
| TRANSMITTING PROCESSOR ID NUMBER |
| TRANSMITTED COMMAND NUMBER |
| PROCESSOR STATUS |

FIG. 10B

RESPONSE TO THE PROCESSOR STATUS CHANGE REPORT COMMAND

| DATA LENGTH |
|---|
| DESTINATION PROCESSOR ID NUMBER |
| TRANSMITTING I/O DEVICE ID NUMBER |
| TRANSMITTED COMMAND NUMBER |
| RECEIVED RESULT |

FIG. 10C

CORRESPONDENCE TABLE CHANGE REPORT

| DATA LENGTH |
|---|
| DESTINATION PROCESSOR ID NUMBER |
| TRANSMITTING I/O DEVICE ID NUMBER |
| TRANSMITTED COMMAND NUMBER |
| CONTENT OF THE CORRESPONDENCE TABLE |

FIG. 11A

RESPONSE TO THE CORRESPONDENCE TABLE CHANGE REPORT COMMAND

| DATA LENGTH |
| --- |
| DESTINATION I/O DEVICE ID NUMBER |
| TRANSMITTING PROCESSOR NUMBER |
| TRANSMITTED COMMAND NUMBER |
| RECEIVED RESULT |

FIG. 11B

I/O PORT STATUS INQUIRY COMMAND

| DATA LENGTH |
| --- |
| DESTINATION I/O DEVICE ID NUMBER |
| TRANSMITTING PROCESSOR ID NUMBER |
| TRANSMITTED COMMAND NUMBER |
| RECEIVED RESULT |

FIG. 11C

RESPONSE TO THE I/O PORT STATUS INQUIRY COMMAND

| DATA LENGTH |
| --- |
| DESTINATION PROCESSOR NUMBER |
| TRANSMITTING I/O DEVICE ID NUMBER |
| TRANSMITTED COMMAND NUMBER |
| I/O PORT STATUS TABLE |

FIG. 12A

PROCESSOR STATUS INQUIRY COMMAND

| DATA LENGTH |
|---|
| DESTINATION PROCESSOR ID NUMBER |
| TRANSMITTING I/O DEVICE ID NUMBER |
| TRANSMITTED COMMAND NUMBER |

FIG. 12B

RESPONSE TO THE PROCESSOR STATUS INQUIRY COMMAND

| DATA LENGTH |
|---|
| DESTINATION I/O DEVICE ID NUMBER |
| TRANSMITTING PROCESSOR ID NUMBER |
| TRANSMITTED COMMAND NUMBER |
| PROCESSOR STATUS |

FIG. 12C

CORRESPONDENCE TABLE INQUIRY COMMAND

| DATA LENGTH |
|---|
| DESTINATION I/O DEVICE ID NUMBER |
| TRANSMITTING PROCESSOR ID NUMBER |
| TRANSMITTED COMMAND NUMBER |

FIG. 12D

RESPONSE TO THE CORRESPONDENCE TABLE INQUIRY COMMAND

| DATA LENGTH |
|---|
| DESTINATION PROCESSOR ID NUMBER |
| TRANSMITTING I/O DEVICE ID NUMBER |
| TRANSMITTED COMMAND NUMBER |
| CONTENT OF THE CORRESPONDENCE TABLE |

FIG. 13

| COMMAND | RECEIVING DEVICE | DESTINATION |
|---|---|---|
| DATA INPUT VIA AN I/O PORT | I/O DEVICE | I/O PORT ACCESS MEANS |
| DATA OUTPUT VIA AN I/O PORT | I/O DEVICE | I/O PORT ACCESS MEANS |
| I/O PORT STATUS CHANGE REPORT | PROCESSOR | PORT STATUS MANAGEMENT MEANS |
| PROCESSOR STATUS CHANGE REPORT | I/O DEVICE | PROCESSOR STATUS MANAGEMENT MEANS |
| CORRESPONDENCE TABLE CHANGE REPORT | PROCESSOR | PORT STATUS MANAGEMENT MEANS |
| I/O PORT STATUS INQUIRY | I/O DEVICE | I/O PORT STATUS MANAGEMENT MEANS |
| PROCESSOR STATUS INQUIRY | PROCESSOR | PROCESSOR STATUS REPORTING MEANS |
| CORRESPONDENCE TABLE INQUIRY | I/O DEVICE | CORRESPONDENCE TABLE MANAGEMENT MEANS |

FIG. 15

I/O PORT STATUS TABLE

31 →

| | | | | 2 | 2 | 2 | 2 |
|---|---|---|---|---|---|---|---|
| | | | | | | | |

PROCESSOR STATUS TABLE

32 →

| 2 | 2 | 2 | 4 | PROCESSOR 1 |
|---|---|---|---|---|
| 2 | 2 | 2 | 4 | 2 |
| 0 | 0 | 0 | 0 | 3 |
| 0 | 0 | 0 | 0 | 4 |

CORRESPONDENCE TABLE

33 →

| | |
|---|---|
| | 1 | ⎫ HIGHWAY 0
| | 2 | ⎭
| | 2 | ⎫ HIGHWAY 1
| | 1 | ⎭
| | 1 | ⎫ HIGHWAY 2
| | 2 | ⎭
| | 2 | ⎫ HIGHWAY 3
| | 1 | ⎭
| | 0 | ⎫ HIGHWAY 4
| | 0 | ⎭
| | |

I/O PORT STATUS TABLE OF A PROCESSOR 1

34-1 →

| | | | | 2 | 1 | 2 | 1 |
|---|---|---|---|---|---|---|---|
| | | | | | | | |

I/O PORT STATUS TABLE OF A PROCESSOR 2

34-2 →

| | | | | 1 | 2 | 1 | 2 |
|---|---|---|---|---|---|---|---|
| | | | | | | | |

FIG. 16

I/O PORT STATUS TABLE

31 →

|   |   |   | 1 | 2 | 2 | 2 | 2 |
|---|---|---|---|---|---|---|---|
|   |   |   |   |   |   |   |   |

PROCESSOR STATUS TABLE

32 →

| 2 | 2 | 2 | 4 | PROCESSOR 1 |
|---|---|---|---|---|
| 2 | 2 | 2 | 4 | 2 |
| 0 | 0 | 0 | 0 | 3 |
| 0 | 0 | 0 | 0 | 4 |

CORRESPONDENCE TABLE

33 →

| | |
|---|---|
| 1 | HIGHWAY 0 |
| 2 | |
| 2 | HIGHWAY 1 |
| 1 | |
| 1 | HIGHWAY 2 |
| 2 | |
| 2 | HIGHWAY 3 |
| 1 | |
| 0 | HIGHWAY 4 |
| 0 | |
| | ⋮ |

I/O PORT STATUS TABLE OF A PROCESSOR 1

34-1 →

|   |   |   |   | 2 | 1 | 2 | 1 |
|---|---|---|---|---|---|---|---|
|   |   |   |   |   |   |   |   |

I/O PORT STATUS TABLE OF A PROCESSOR 2

34-2 →

|   |   |   |   | 1 | 2 | 1 | 2 |
|---|---|---|---|---|---|---|---|
|   |   |   |   |   |   |   |   |

FIG. 17

I/O PORT STATUS TABLE

| | | | | | | | |
|---|---|---|---|---|---|---|---|
| | | | 2 | 2 | 2 | 2 | 2 |
| | | | | | | | |

31

PROCESSOR STATUS TABLE

| | | | | |
|---|---|---|---|---|
| 2 | 3 | 2 | 4 | PROCESSOR 1 |
| 2 | 2 | 3 | 4 | 2 |
| 0 | 0 | 0 | 0 | 3 |
| 0 | 0 | 0 | 0 | 4 |

32

CORRESPONDENCE TABLE

| | |
|---|---|
| | 1 |
| | 2 |
| | 2 |
| | 1 |
| | 1 |
| | 2 |
| | 2 |
| | 1 |
| | 1 |
| | 2 |
| | |

HIGHWAY 0
HIGHWAY 1
HIGHWAY 2
HIGHWAY 3
HIGHWAY 4

33

I/O PORT STATUS TABLE OF A PROCESSOR 1

| | | | | | | | |
|---|---|---|---|---|---|---|---|
| | | | 1 | 2 | 1 | 2 | 1 |
| | | | | | | | |

34-1

I/O PORT STATUS TABLE OF A PROCESSOR 2

| | | | | | | | |
|---|---|---|---|---|---|---|---|
| | | | 2 | 1 | 2 | 1 | 2 |
| | | | | | | | |

I/O PORT STATUS TABLE

| | | | | 2 | 2 | 3 | 2 |
|---|---|---|---|---|---|---|---|
| | | | | | | | |

31

PROCESSOR STATUS TABLE

| 2 | 2 | 2 | 4 | PROCESSOR 1 |
|---|---|---|---|---|
| 2 | 2 | 2 | 4 | 2 |
| 0 | 0 | 0 | 0 | 3 |
| 0 | 0 | 0 | 0 | 4 |

32

CORRESPONDENCE TABLE

33

| |
|---|
| 1 | HIGHWAY 0
| 2 |
| 2 | HIGHWAY 1
| 1 |
| 1 | HIGHWAY 2
| 2 |
| 2 | HIGHWAY 3
| 1 |
| 0 | HIGHWAY 4
| 0 |
| |

⋮

I/O PORT STATUS TABLE OF A PROCESSOR 1

| | | | | 2 | 1 | 4 | 1 |
|---|---|---|---|---|---|---|---|
| | | | | | | | |

34-1

I/O PORT STATUS TABLE OF A PROCESSOR 2

| | | | | 1 | 2 | 3 | 2 |
|---|---|---|---|---|---|---|---|
| | | | | | | | |

I/O PORT STATUS TABLE

31 — | | | | 2 | 2 | 2 | 2 | 2 |

PROCESSOR STATUS TABLE

32 —
| 2 | 3 | 2 | 4 | PROCESSOR 1 |
|---|---|---|---|---|
| 2 | 2 | 3 | 4 | 2 |
| 1 | 0 | 0 | 0 | 3 |
| 0 | 0 | 0 | 0 | 4 |

CORRESPONDENCE TABLE

33 —
| | |
|---|---|
| 1 | HIGHWAY 0 |
| 2 | |
| 2 | HIGHWAY 1 |
| 1 | |
| 1 | HIGHWAY 2 |
| 2 | |
| 2 | HIGHWAY 3 |
| 1 | |
| 1 | HIGHWAY 4 |
| 2 | |

I/O PORT STATUS TABLE OF A PROCESSOR 1

34-1 — | | | | 1 | 2 | 1 | 2 | 1 |

I/O PORT STATUS TABLE OF A PROCESSOR 2

34-2 — | | | | 2 | 1 | 2 | 1 | 2 |

I/O PORT STATUS TABLE OF A PROCESSOR 3

I/O PORT STATUS TABLE

31

| | | | 2 | 2 | 2 | 2 | 2 |
|---|---|---|---|---|---|---|---|
| | | | | | | | |

PROCESSOR STATUS TABLE

32

| 2 | 2 | 2 | 4 | PROCESSOR 1 |
|---|---|---|---|---|
| 2 | 2 | 2 | 4 | 2 |
| 2 | 1 | 1 | 4 | 3 |
| 0 | 0 | 0 | 0 | 4 |

CORRESPONDENCE TABLE

33

| | |
|---|---|
| 1 | ⎫ HIGHWAY 0 |
| 2 | ⎭ |
| 2 | ⎫ HIGHWAY 1 |
| 1 → 3 | ⎭ |
| 1 | ⎫ HIGHWAY 2 |
| 2 | ⎭ |
| 2 | ⎫ HIGHWAY 3 |
| 1 | ⎭ |
| 1 → 3 | ⎫ HIGHWAY 4 |
| 2 → 3 → 1 | ⎭ |
| | ⋮ |

I/O PORT STATUS TABLE OF A PROCESSOR 1

34-1

| | | | 2 | 2 | 1 | 0 | 1 |
|---|---|---|---|---|---|---|---|
| | | | | | | | |

I/O PORT STATUS TABLE OF A PROCESSOR 2

34-2

| | | | 0 | 1 | 2 | 1 | 2 |
|---|---|---|---|---|---|---|---|
| | | | | | | | |

I/O PORT STATUS TABLE OF A PROCESSOR 3

34-3

| | | | 1 | 0 | 0 | 2 | 0 |
|---|---|---|---|---|---|---|---|
| | | | | | | | |

FIG. 21

I/O PORT STATUS TABLE

| 31 |  |  |  | 2 | 2 | 2 | 2 | 2 |
|---|---|---|---|---|---|---|---|---|
|  |  |  |  |  |  |  |  |  |

PROCESSOR STATUS TABLE

| 32 | 4 | 0 | 4 | 4 | PROCESSOR 1 |
|---|---|---|---|---|---|
|  | 2 | 4 | 0 | 4 | 2 |
|  | 2 | 1 | 1 | 4 | 3 |
|  | 0 | 0 | 0 | 0 | 4 |

CORRESPONDENCE TABLE

| 33 | 1 → 2 | ⎫ HIGHWAY 0 |
|---|---|---|
|  | 2 → 1 | ⎭ |
|  | 2 | ⎫ HIGHWAY 1 |
|  | 1 → 3 | ⎭ |
|  | 1 → 2 | ⎫ HIGHWAY 2 |
|  | 2 → 1 | ⎭ |
|  | 2 | ⎫ HIGHWAY 3 |
|  | 1 | ⎭ |
|  | 3 | ⎫ HIGHWAY 4 |
|  | 1 | ⎭ |
|  |  |  |

I/O PORT STATUS TABLE OF A PROCESSOR 1

| 34-1 |  |  |  |  |  |  |  |  | UNKNOWN |
|---|---|---|---|---|---|---|---|---|---|
|  |  |  |  |  |  |  |  |  |  |

I/O PORT STATUS TABLE OF A PROCESSOR 2

| 34-2 |  |  |  | 0 | 1 | 1 | 1 | 1 |
|---|---|---|---|---|---|---|---|---|
|  |  |  |  |  |  |  |  |  |

I/O PORT STATUS TABLE OF A PROCESSOR 3

| 34-3 |  |  | 1 | 0 | 0 | 2 | 0 |
|---|---|---|---|---|---|---|---|
|  |  |  |  |  |  |  |  |

FIG. 23

(A1)
    START OF AN I/O PORT INSTALLATION (A11)         ↓                                                   NO
    IS THE STATUS OF THE I/O PORT SET TO "UNINSTALLED"? ——┐
(A12)     ↓ YES                                     ↓
    SET THE STATUS OF THE I/O PORT TO "BEING INSTALLED"     REJECT
(A13)       ↓
    INSTALL THE I/O PORT (A2)
    COMPLETION OF AN I/O PORT INSTALLATION (A21)         ↓                                                   NO
    IS THE STATUS OF THE I/O PORT SET TO "BEING INSTALLED"? ——┐
(A22)     ↓ YES                                       ↓
    SET THE STATUS OF THE I/O PORT TO "ACTIVE"             REJECT
(A23)       ↓
    INQUIRE THE PROCESSOR STATUS     ←—→ | PROCESSOR STATUS MANAGEMENT MEANS |
            ↓
(A24)
    ASSIGN THE ACTIVE/STANDBY PROCESSORS TO THE
    INSTALLED I/O PORTS SUCH THAT THE NUMBER OF I/O
    PORTS THAT THE PROCESSORS IS IN CHARGE OF LEVELS
(A25)      ↓
    SET THE ACTIVE/STANDBY PROCESSORS   ←—→ | CORRESPONDENCE TABLE MANAGEMENT MEANS |
    FOR THE INSTALLED I/O PORT IN THE
    CORRESPONDENCE TABLE
(A26)      ↓
    NOTIFY THE PROCESSORS OF THE STATUS
    OF THE I/O PORTS USING THE I/O PORT   ←—→ | DATA TRANSFER MEANS |
    STATUS CHANGE REPORT COMMAND

FIG. 27

PROCESSOR STATUS MANAGEMENT MEANS
OCCURRENCE OF AN EVENT
↓
BRANCHES TO EVENT-SPECIFIC PROCESSES

- → START OF A PROCESSOR INSTALLATION (B 1)
- → COMPLETION OF A PROCESSOR INSTALLATION (B 2)
- → OCCURRENCE OF AN OVERLOAD IN A PROCESSOR (B 3)
- → REMOVAL OF AN OVERLOAD IN A PROCESSOR (B 4)
- → OCCURRENCE OF A FAULT IN A PROCESSOR (B 5)
- → RECOVERY FROM A FAULT IN A PROCESSOR (B 6)
- → BLOCKING OF A PROCESSOR (B 7)
- → UNBLOCKING OF A PROCESSOR (B 8)
- → START OF A PROCESSOR FILE UPDATE (B 9)
- → COMPLETION OF A PROCESSOR FILE UPDATE (B b 1)
- → START OF A PROCESSOR UNINSTALLATION (B b 2)
- → COMPLETION OF A PROCESSOR UNINSTALLATION (B b 3)

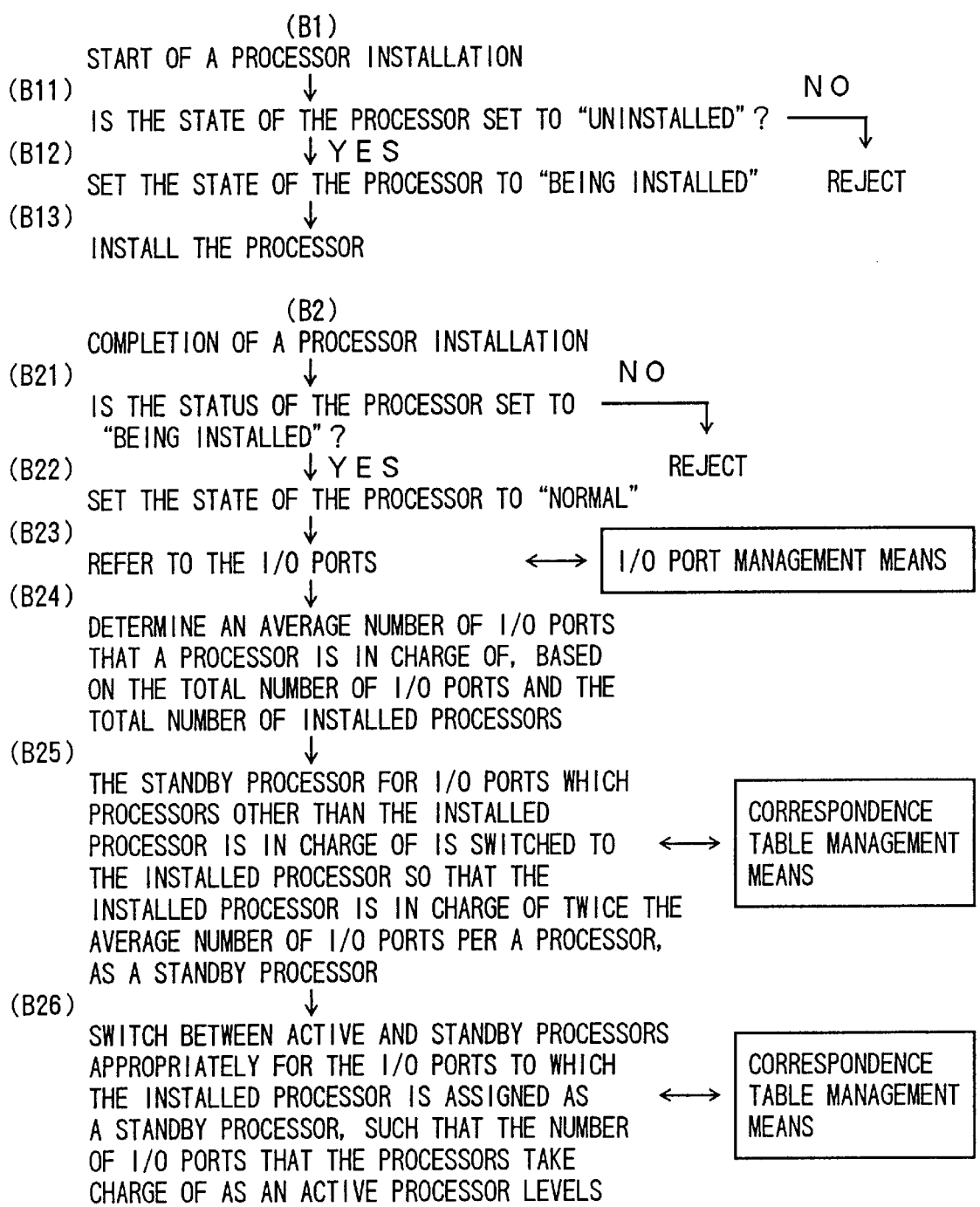

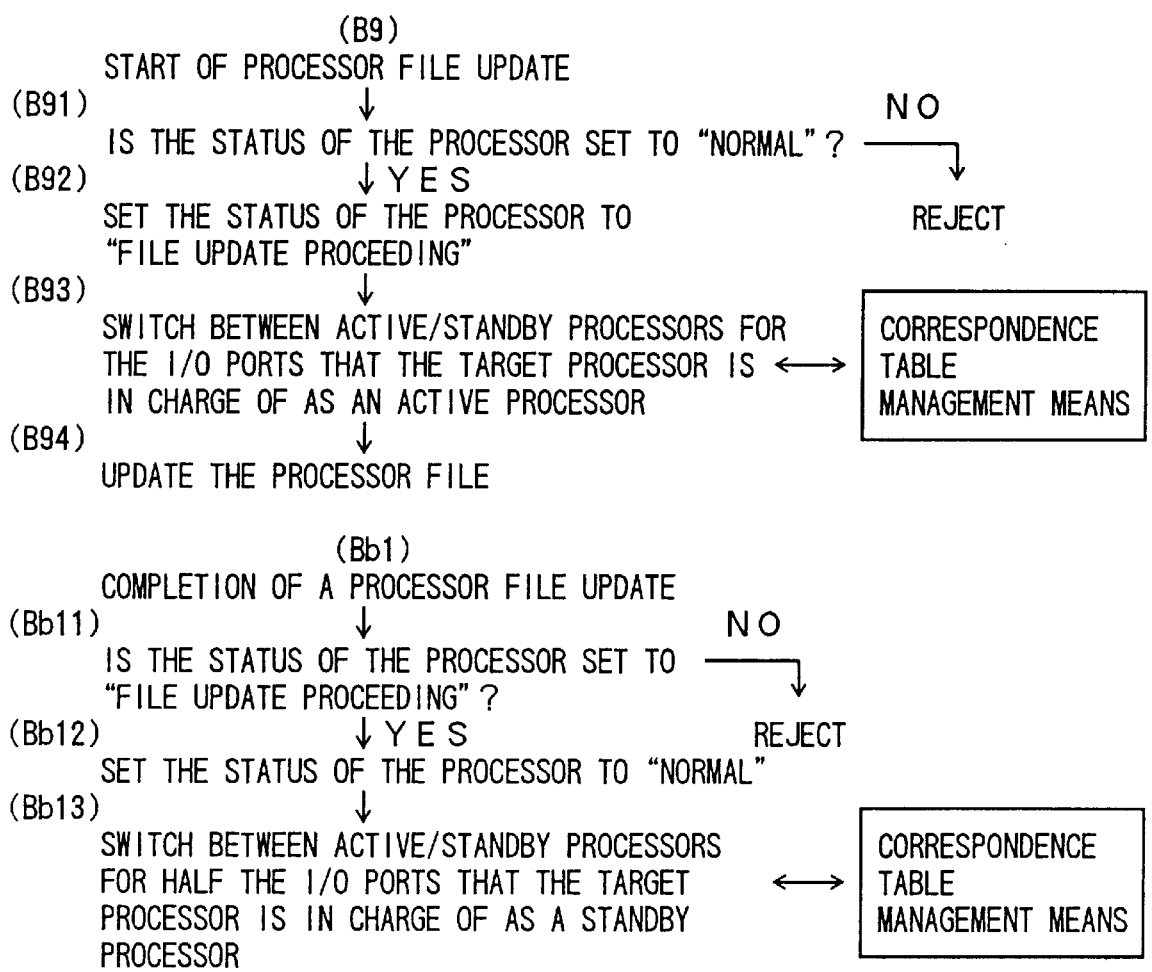

FIG. 33

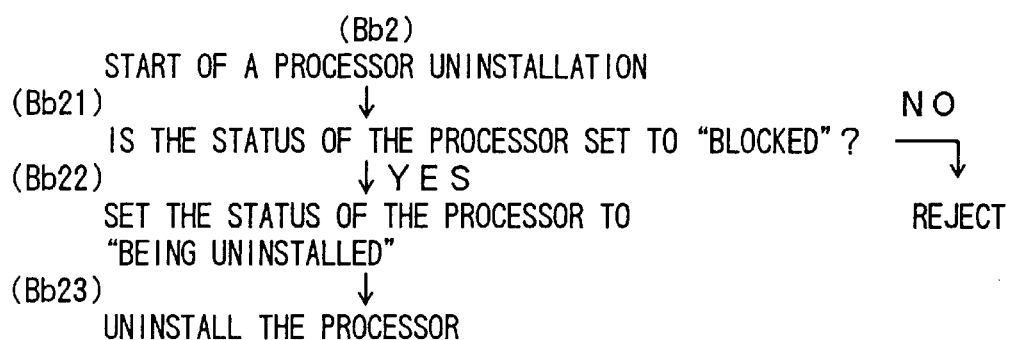

(Bb2) START OF A PROCESSOR UNINSTALLATION
(Bb21) IS THE STATUS OF THE PROCESSOR SET TO "BLOCKED"? — NO → REJECT
(Bb22) ↓ YES
SET THE STATUS OF THE PROCESSOR TO "BEING UNINSTALLED"
(Bb23) ↓
UNINSTALL THE PROCESSOR

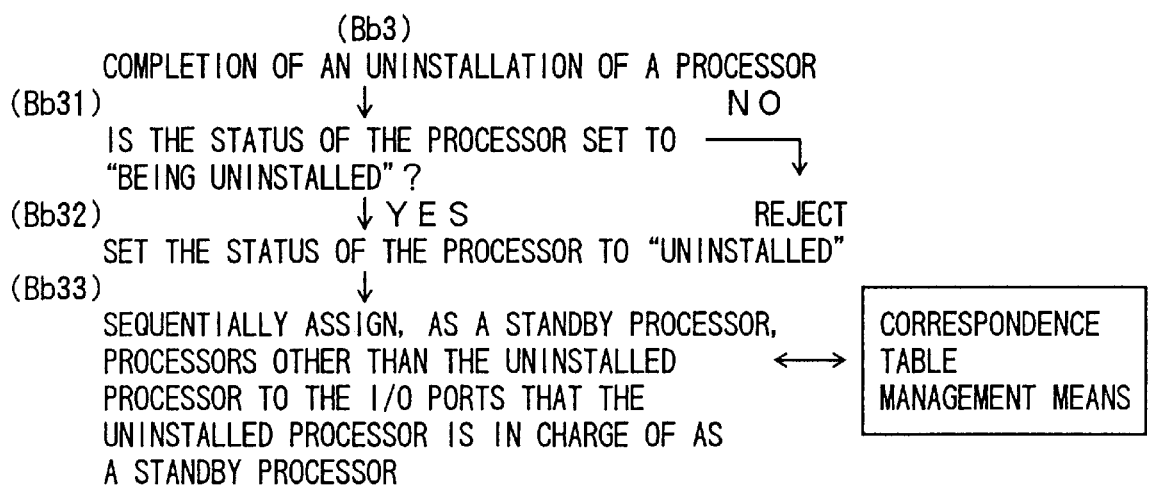

(Bb3) COMPLETION OF AN UNINSTALLATION OF A PROCESSOR
(Bb31) IS THE STATUS OF THE PROCESSOR SET TO "BEING UNINSTALLED"? — NO → REJECT
(Bb32) ↓ YES
SET THE STATUS OF THE PROCESSOR TO "UNINSTALLED"
(Bb33) ↓
SEQUENTIALLY ASSIGN, AS A STANDBY PROCESSOR, PROCESSORS OTHER THAN THE UNINSTALLED PROCESSOR TO THE I/O PORTS THAT THE UNINSTALLED PROCESSOR IS IN CHARGE OF AS A STANDBY PROCESSOR ←→ CORRESPONDENCE TABLE MANAGEMENT MEANS

CORRESPONDENCE TABLE MANAGEMENT MEANS (C1) INITIAL SETTING IN THE I/O DEVICE
↓
(C2) LOAD THE CORRESPONDENCE TABLE BACKUP DATA INTO THE CORRESPONDENCE TABLE
↓
(C3) REPORT THE CONTENT OF THE CORRESPONDENCE TABLE TO ALL THE PROCESSORS
↓
(C4) COMMAND-DRIVEN CHANGE
↓
(C5) COPY THE CONTENT OF THE CORRESPONDENCE TABLE TO THE BACKUP DATA STORAGE UNIT

FIG. 35A

DATA TRANSFER MEANS
(E1)
    DATA TRANSMISSION
(E2)        ↓
    SEND A TRANSMITTED COMMAND FROM MEANS TO A COMMUNICATION BUS

FIG. 35B (E3)
    DATA RECEPTION
(E4)        ↓
    CHECKS THE COMMAND CODE RECEIVED
(E5)        ↓
    ACTIVATE MEANS CORRESPONDING TO THE COMMAND CODE RECEIVED

FIG. 36A

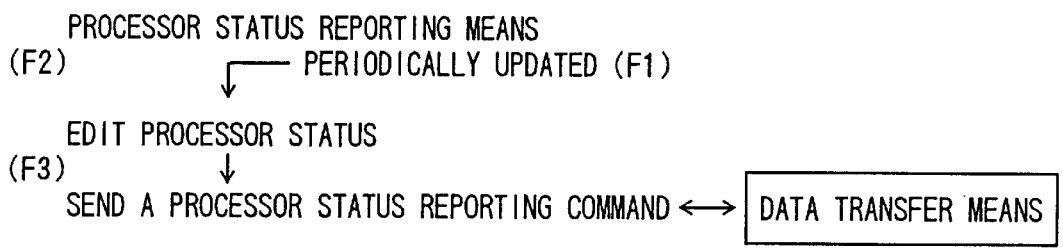

PROCESSOR STATUS REPORTING MEANS
(F2)  ┌── PERIODICALLY UPDATED (F1)
       ↓
   EDIT PROCESSOR STATUS
(F3)      ↓
   SEND A PROCESSOR STATUS REPORTING COMMAND ⟷ DATA TRANSFER MEANS

FIG. 36B

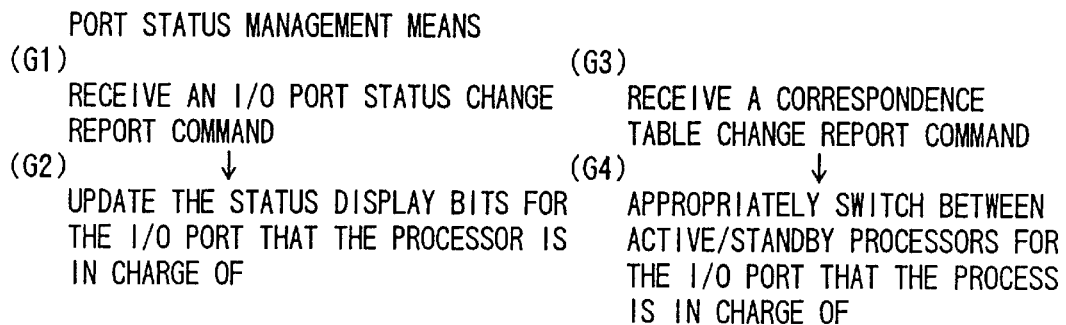

PORT STATUS MANAGEMENT MEANS
(G1)                                          (G3)
   RECEIVE AN I/O PORT STATUS CHANGE              RECEIVE A CORRESPONDENCE
   REPORT COMMAND                                 TABLE CHANGE REPORT COMMAND
(G2)        ↓                                 (G4)         ↓
   UPDATE THE STATUS DISPLAY BITS FOR             APPROPRIATELY SWITCH BETWEEN
   THE I/O PORT THAT THE PROCESSOR IS             ACTIVE/STANDBY PROCESSORS FOR
   IN CHARGE OF                                   THE I/O PORT THAT THE PROCESS
                                                  IS IN CHARGE OF

INFORMATION PROCESSING APPARATUS AND DISTRIBUTED PROCESSING CONTROL METHOD

BACKGROUND OF THE INVENTION

1. Field of the Invention

The present invention relates to information processing apparatuses and distributed processing control methods and more particularly, to an information processing apparatus and a distributed processing control method in which a plurality of processors are used to perform a distributed load processing.

Examples of information processing apparatuses provided with a plurality of processors are: a dual-redundancy information processing apparatus having an active processor and a standby (reserve) processor so as to produce improved reliability; and an information processing apparatus having a plurality of processors so as to perform processes with improved efficiency. In these information processing apparatuses, there is a demand for adapting to an increase or a reduction in the system scale. Also demanded are provisions for easily remedying a fault.

2. Description of the Related Art

FIG. 1A is a schematic diagram of a conventional electronic switch including a main processor (MPR) 100, call processors (CPR) 101-1–101-n, networks 102-11–102-n, and a bus 103. Each of the networks 102-11–102-n is controlled by the call processors 101-1–101-n, respectively. The call processors 101-1–101-n are controlled by a main processor 100.

The electronic switch having the multi-processor construction described above performs distributed processing of calls. When such an electronic switch is upgraded or repaired, individual call processors or networks may be installed or uninstalled. The call processors 101-1–101-n are managed by the main processor 100. There is also known a construction where each of the call processors 101-1–101-n has a duplex system including an active system and a standby system. The main processor 100 may also have a duplex system. Provision of the duplex system is intended as means for improving the reliability.

The electronic switch may also be constructed such that the switching control function is divided into a plurality of functions and a plurality of processors are provided for each function. When a switching control function is to be executed, one of the plurality of processors is selected in order to execute the target function (see Japanese Laid-Open Patent Application No. 55-53990). In one known distributed load arrangement for processing ATM cells, a plurality of processing apparatuses (processors) for processing ATM cells are connected to a plurality of terminals via interface circuits (see Japanese Laid-Open Patent Application No. 4-179327).

FIG. 1B is a schematic diagram of a conventional ATM switching system suitable for use in a B-ISDN system. A plurality of call processors (CPR) 106-1–106-n, for setting up and releasing an SVC call by controlling a broadband signaling controller described later, are connected between a corresponding one of a plurality of ATM switches 104-1–104-n and a bus 107. A plurality of additional call processors 106'-1–106'-n are coupled to a plurality of additional ATM switches 104'-1–104'-n, respectively, so as to constitute a duplex system. Broadband signaling controllers (BSGC) 105-1–105-n are coupled to the ATM switches 104-1–104-n, respectively, for processing the Layer 2 protocol according to the B-ISDN specification. Additional broadband signaling controllers (BSGC) 105'-1 105'-n are coupled to the additional ATM switches 104'-1–104'-n, respectively, so as to constitute a duplex broadband signaling controller system. A main processor (MPR) 108 is provided to control the entire switching system including the ATM switches. Line interface units 103-1 and 103-2 each accommodates a plurality of circuits. Although not shown, the ATM switches 104-2–104-n and the additional ATM switches 104'-2–104'-n are also coupled to respective line interfaces.

In the conventional ATM switching system as shown in FIG. 1B, call processors 106-1 106-n are fixedly coupled to the respective ATM switches 104-1–104-n. The same thing is true of the additional call processors 106'-1–106'-n, the broadband signaling controllers 105-1–105-n and the additional broadband signaling controllers 105'-1–105'-n. As the volume of data requiring to be processed increases, an increasing volume of load is imposed on each of the call processors and the broadband signaling controllers, causing the number of calls handled by each call processor to be decreased. Such a conventional switching system does not provide means to flexibly distribute required processes among the plurality of call processors.

One approach to resolve this problem is to upgrade the call processor or the broadband signaling controller. However, such a solution invites an associated increase in the cost.

A description will now be given of another disadvantage of the conventional processing system.

In the conventional duplex system including the active system and the standby system, the process can continue in the event of a fault by switching from the active system to the standby system. A system down results when a fault occurs after the standby system is switched to the active system. In the multi-processor distributed load arrangement such as the one shown in FIG. 1A, each of the call processors is fixedly coupled to the corresponding network so that the network governed by a faulty call processor cannot be controlled. Thus, proper service may not be provided due to the fault. Even if the call processors 101-1–101-n have a duplex system, if both the active system and the standby system fail, the network governed by the faulty processors fails to provide the service.

The aforementioned example of the related art (Japanese Laid-Open Patent Application No. 55-53990) in which an extra load is assigned to a free processor selected from a group of processors, each of the processors is assigned to the respective function. Such a system lacks flexibility and requires a selection of a free processor each time a process is requested. In the other example of the prior art (Japanese Laid-Open Patent Application No. 4-179327) where a plurality of processing apparatuses are connected via interface circuits and via a common bus, in order to perform distributed load processing, ATM cells are processed depending on the processing capability of the processors. However, Japanese Laid-Open Patent Application No. 4-179327 does not give any description of a specific manner in which the distributed load processing is executed, nor does it describe processes to be executed in the event of a fault, a system change or the like.

SUMMARY OF THE INVENTION

Accordingly, an object of the present invention is to provide a distributed load processing system in which the aforementioned problems are eliminated.

Another and more specific object of the present invention is to provide a multi-processor distributed load arrangement in which a system change such as an installation of a processor or an uninstallation thereof is easy, and in which a fault can be easily remedied.

In order to achieve the aforementioned objects, the present invention provides a an information processing apparatus comprising: one or a plurality of input and output devices each having a plurality of input and output ports; and a plurality of processors which, connected to the one or a plurality of input and output ports via a bus, process requests for processes requiring use of the input and output ports in a distributed manner, the one or a plurality of input and output devices each comprising: input and output port status management means maintaining an input and output port status table listing status of each of the plurality of input and output ports; processor status management means maintaining a processor status table listing status of each of the plurality of processors; and correspondence table management means managing correspondence between the plurality of input and output ports and pairs of active and standby processors, using a correspondence table and each of the plurality of processors comprising: processor-specific input and output port status management means maintaining a processor-specific input and output port status management table listing status of each of the plurality of input and output ports to which a processor is assigned.

The aforementioned objects may also be accomplished by a distributed processing control method for use in an information processing apparatus comprising one or a plurality of input and output devices each having a plurality of input and output ports, and a plurality of processors connected to one or a plurality of input and output devices via a bus, the one or a plurality of input and output devices each comprising: input and output port status management means maintaining an input and output port status table listing status of each of the plurality of input and output ports; processor status management means maintaining a processor status table listing status of each of the plurality of processors; and correspondence table management means managing correspondence between the plurality of input and output ports and pairs of active and standby processors, and each of the plurality of processors comprising: processor-specific input and output port status management means maintaining a processor-specific input and output port status management table listing status of each of the plurality of input and output ports to which a processor is assigned, the distributed control method comprising the steps of: a) receiving a request for a process requiring a use of one of the plurality of input and output ports; b) determining an active processor for the input and output port requested by referring to the correspondence table; and c) causing the active processor determined in step b) to process the requested process.

According to an information processing apparatus and a distributed processing control method of the present invention, a plurality of processors perform a distributed processing of a plurality of requests via an input/output port. The correspondence table management means of the input/output device maintains the correspondence table specifying the correspondence between the input/output ports and the associated pairs of active and standby processors. Reassignment of processors to input/output ports required in events such as an installation or an uninstallation of an input/output port or a processor, and an occurrence of or a recovery from a fault in an input/output port or a processor is effected by updating the correspondence table accordingly. The processors are notified of the reassignment by a correspondence table change report command so that the processors can continue to perform the distributed processing after the event.

Accordingly, the present invention advantageously ensures flexible provisions for an increase in the volume of processing request or for an expansion of the system and the like. In the event of a fault, switching from the active system to the standby system can be efficiently performed. Assignment of active and standby processors to input/output ports is not difficult so that, even when a fault occurs in both the active processor and the standby processor, other processors can easily be put into service as an active processor, ensuring that the distributed load processing can continue.

BRIEF DESCRIPTION OF THE DRAWINGS

Other objects and further features of the present invention will be apparent from the following detailed description when read in conjunction with the accompanying drawings, in which:

FIG. 3A shows an input/output port status; table;

FIG. 3B shows status display bits and corresponding events;

FIG. 4A is a processor status table;

FIG. 4B is a table illustrating transitions between different statuses;

FIG. 5A shows a correspondence table;

FIG. 5B shows a processor-specific input/output port status table;

FIG. 7A shows a data input command supplied to an input/output port;

FIG. 7B shows a response to a data input command;

FIG. 8A shows a data output command supplied to the input/output port;

FIG. 8B shows a response to an data output command;

FIG. 9A shows an input/output port status change report command;

FIG. 9B shows a response to an input/output port status change report command;

FIG. 10A shows a processor status change report command;

FIG. 10B shows a response to a processor status change report command;

FIG. 10C shows a correspondence table change report command;

FIG. 11A shows a response to a correspondence table change report command;

FIG. 11B shows an input/output port status inquiry command;

FIG. 11C shows a response to an input/output port status inquiry command;

FIG. 12A shows a processor status inquiry command;

FIG. 12B shows a response to a processor status inquiry command;

FIG. 12C shows a correspondence table inquiry command;

FIG. 12D shows a response to a correspondence table inquiry table;

FIG. 13 lists commands according to the present invention and destinations thereof;

FIG. 15 shows an input/output port status table, a processor status table, a correspondence table and processor-specific input/output port status tables;

FIG. 16 shows the tables of the present invention updated responsive to an event;

FIG. 17 shows the tables of the present invention updated responsive to another event;

FIG. 18 shows the tables of the present invention updated responsive to another event;

FIG. 19 shows the tables of the present invention updated responsive to another event;

FIG. 20 shows the tables of the present invention updated responsive to still another event;

FIG. 21 shows the tables of the present invention updated responsive to yet another event;

FIG. 23 is a flowchart showing processes selected responsive to events of a start and a completion of an input/output port installation;

FIG. 27 is a flowchart showing how different processes are selected responsive to events occurring in a processor;

FIG. 28 is a flowchart showing processes selected responsive to events of a start and a completion of a processor installation;

FIG. 32 is a flowchart showing processes selected responsive to events of a start or a completion of a processor file update;

FIG. 33 is a flowchart showing processes selected responsive to events of a start or completion of a processor uninstallation;

FIG. 35A is a flowchart showing a data transmission process executed by the data transfer means;

FIG. 35B is a flowchart showing a data reception process executed by the data transfer means;

FIG. 36A is a flowchart for a process executed by the processor status reporting means;

FIG. 36B is a flowchart for a process executed by the port status management means;

DESCRIPTION OF THE PREFERRED EMBODIMENTS

Figure 2:
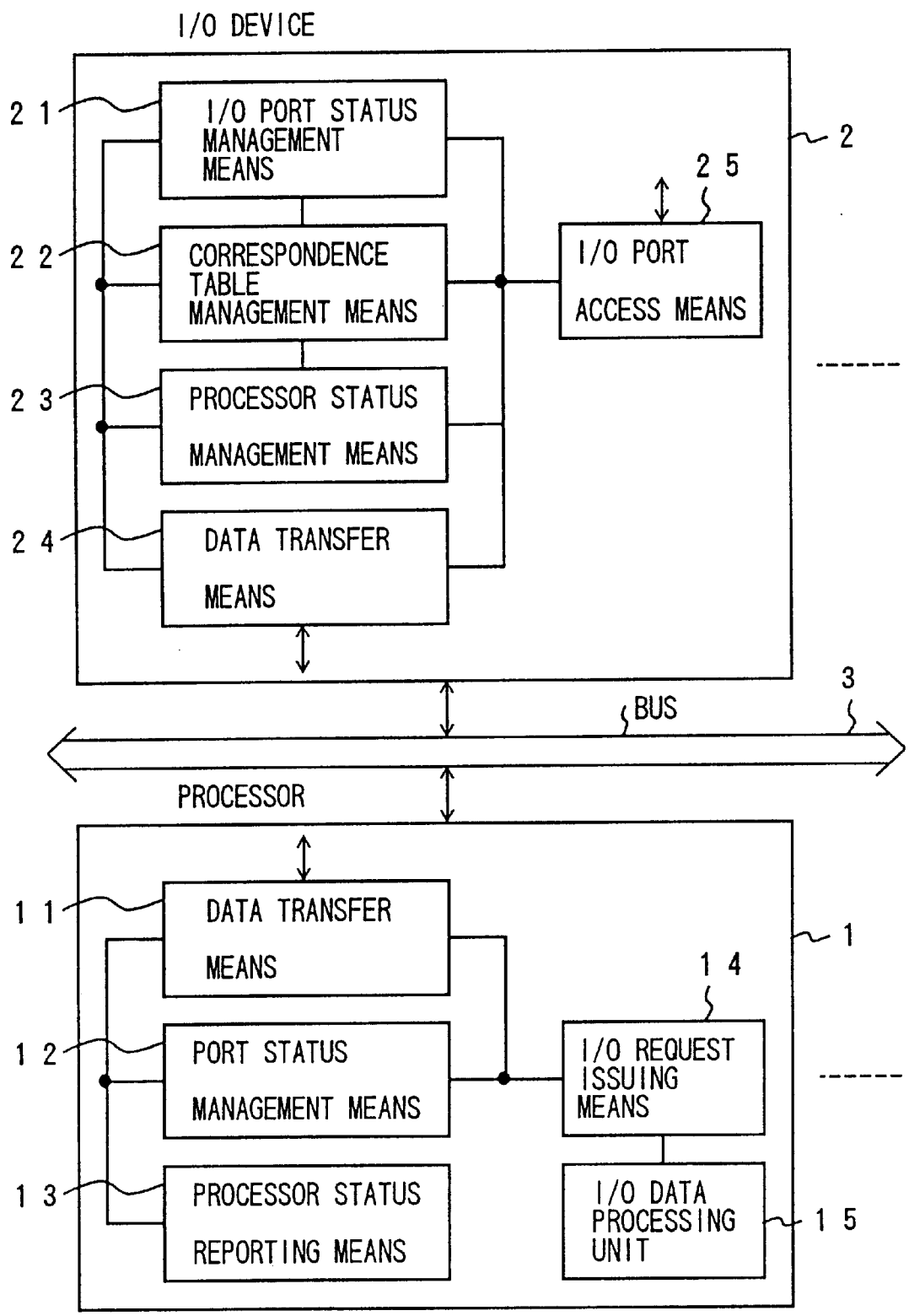
FIG. 2 is a schematic illustration of a principle of the present invention.

FIG. 2 is a schematic illustration of a principle of the present invention and shows a processor 1 and an input/output device 2 connected to a bus 3. A plurality of processors 1 and one or a plurality of input/output devices 2 are connected to the bus 3 so as to constitute an information processing apparatus. When the present invention is applied to an electronic switch, a network coupled to the input/output device 2 can be controlled. The input/output device 2 may be provided with an input/output port (highway).

The processor 1 includes data transfer means 11, a port status management means 12, processor status reporting means 13, input/output request issuing means 14 and an input/output data processing unit 15. The input/output device 2 includes input/output port status management means 21, correspondence table management means 22, processor status management means 23, data transfer means 24 and input/output port access means 25.

The data transfer means 11 of the processor 1 exchanges data with the input/output device 2 or with another processor (not shown) via the bus 3. In accordance with a processor-specific input/output port status table formed in a memory or the like, the port status management means 12 manages the status of input/output ports controlled by the processor 1. The processor status reporting means 13 notifies the input/output device 2 of a fault or regularly notifies the input/output device 2 of events in the processor 1.

The input/output request issuing means 14 issues a data input/output request to an input/output port of the input/output device 2. The input/output data processing unit 15 processes data that arrives via the input/output port according to the request. The means described above can easily be implemented by a computing function, a communicating function and a memory function.

The input/output port status management means 21 of the input/output device 2 monitors whether or not the input/output port is installed in accordance with the input/output port status table formed in the memory or the like. The correspondence table management means 22 forms a correspondence table which specifies active processors and standby processors in a memory. The correspondence table management table 22 updates the content of the correspondence table responsive to events such as an installation of the processor. The processor status management means 23 manages the status of the processors by maintaining a processor status table formed in a memory or the like for specifying the use of the processor as an active processor or a standby processor. The processor status table also registers any occurrence of a fault or the like.

Like the data transfer means 11 of the processor 1, the data transfer means 24 controls data transmission and reception via the bus 3. The input/output port access means 25 receives an input/output request issued by the processor 1 to the input/output device 2, via the data transfer means 24. The means described above can easily be implemented by the computing function, the communicating function and the memory function.

FIG. 3A shows an input/output port status table 31. FIG. 3B shows status display bits and corresponding events. The input/output port table 31 may be formed in the input/output port status management means 21 or in a memory not shown. The table of FIG. 3A has a 32-bit x n table format. In the input/output port status table 31, status display bits $S_1$ indicating the status of input/output ports are provided at addresses assigned to the respective input/output ports. Specifically, non-installation of the input/output port is indicated by the status display bits $S_1=0$, installation or non-installation of the input/output port is indicated by the status display bits $S_1=1$, active use of the input/output port is indicated by the status display bits $S_1=2$, and a blocking or fault of the input/output port is being in a fault; or a blocking is indicated by the status display bits $S_1=3$. While only 2 bits are necessary to indicate the status, 4 bits may be provided so as to fit properly within the 32-bit word format to indicate the status of 8 input/output ports.

FIG. 4B is a status transition diagram showing how different status display bits $S_1$ are set up depending on various events including a start of the installation of the input/output port, a completion of the installation, a fault, a recovery from a fault, a blocking, an unblocking, a start of uninstallation and completion of uninstallation. Before the installation of an input/output port, the status display bit is set to 1 by the input/output port status management means 21. When the installation is started, the status display bit is set to 1. The status display bit is set to 2 when the installation is completed.

In the event of a fault, the status display bit $S_1$ is set to 3. When a recovery from the fault has occurred, $S_1$ is set to 2. If a blocking occurs while the input/output port is being used in the active system, $S_1$ is set to 3. When the unblocking occurs, $S_1$ is set to 2. When the input/output port is to be uninstalled, a blocking is forced to occur. Therefore, $S_1$ is set to 3 and then to 1. When the uninstallation is completed, $S_1$ is set to 0. In this way, the status of the input/output ports is managed.

When an input/output port is installed, the status display bit $S_1$ for that input/output port is changed from 0 to 1. When the installation is completed, $S_1$ is changed from 1 to 2 indicating that the port is used in the active system. At this status, no processor is assigned to the input/output port just installed. Therefore, the input/output port status management means makes an inquiry to the processor status management means 23 of the status of the processors 1.

A processor capable of subjecting more input/output ports to its control than other processors will be referred to as having a greater "margin of operability". The margin of operability of each of the processors 1 is determined by referring to the maximum number of input/output ports that each of the processors 1 can handle, and the number of input/output ports that each of the processors 1 is handling as an active processor. The processor 1 with the greatest margin of operability is designated as the active processor, and the processor 1 with the next greatest margin of operability is designated as the standby processor. The correspondence table management means 22 registers the designated processors in the correspondence table.

If there is a plurality of processors that provide the maximum margin of operability, the active processor and the standby processor may be selected randomly. An input/output port status change command notifies the processors 1 of a change in the status of the input/output port via the data transfer means 24. The port status management means 12 of the processor 1 updates the information for managing the status of the input/output ports.

When a fault occurs in the input/output port of the active system, the status display bit $S_1$ is changed from 2 to 3. The input/output port status change command that arrives via the data transfer means 24 notifies the processor 1 of the event of the fault.

When the fault in the input/output port is removed, the status display bit S1 changes from 3 to 2 and the processors 1 are notified by the input/output port status change report command that arrives via the data transfer means 24 of a recovery from the fault. The processors 1 receive that command via the data transfer means 11 so that the port status management means 12 therein restores the status of the faulty input/output port and restarts the access to the input/output port.

Maintenance personnel can block an input/output port in the active system using a command. In this case, the status display bit S1 changes from 2 to 3. As in the case of the aforementioned provisions for a fault, the processors 1 are notified by the input/output port status change report command of the blocking of the input/output port. The processors receiving that command change the status of the relevant input/output port to "blocked", disabling any access to that input/output port. When the maintenance personnel unblocks the input/output port using a command, the status display bit S1 changes from 3 to 2. As in the case of the recovery from a fault described above, the processors 1 are notified by the input/output port status change report command of an unblocking of the input/output port. The processors receiving that command restarts the access to the input/output port.

Uninstallation of an input/output port is possible only while the input/output port is in a blocked status. Therefore, uninstallation of the input/output port is started after the maintenance personnel blocks the relevant input/output port using a command. In this case, the status display bit S1 changes from 3 to 1. When the uninstallation of the input/output port is completed, that is, when the input/output port is uninstalled, the status display bit S1 changes from 1 to 0. The input/output port status management means 21 requests the correspondence table management means 22 to remove an entry for the relevant input/output port and notifies the processors 1 of the removal using the input/output port status change report command. Each port management means 12 of the processors updates the status of the input/output port.

Figure 1A:
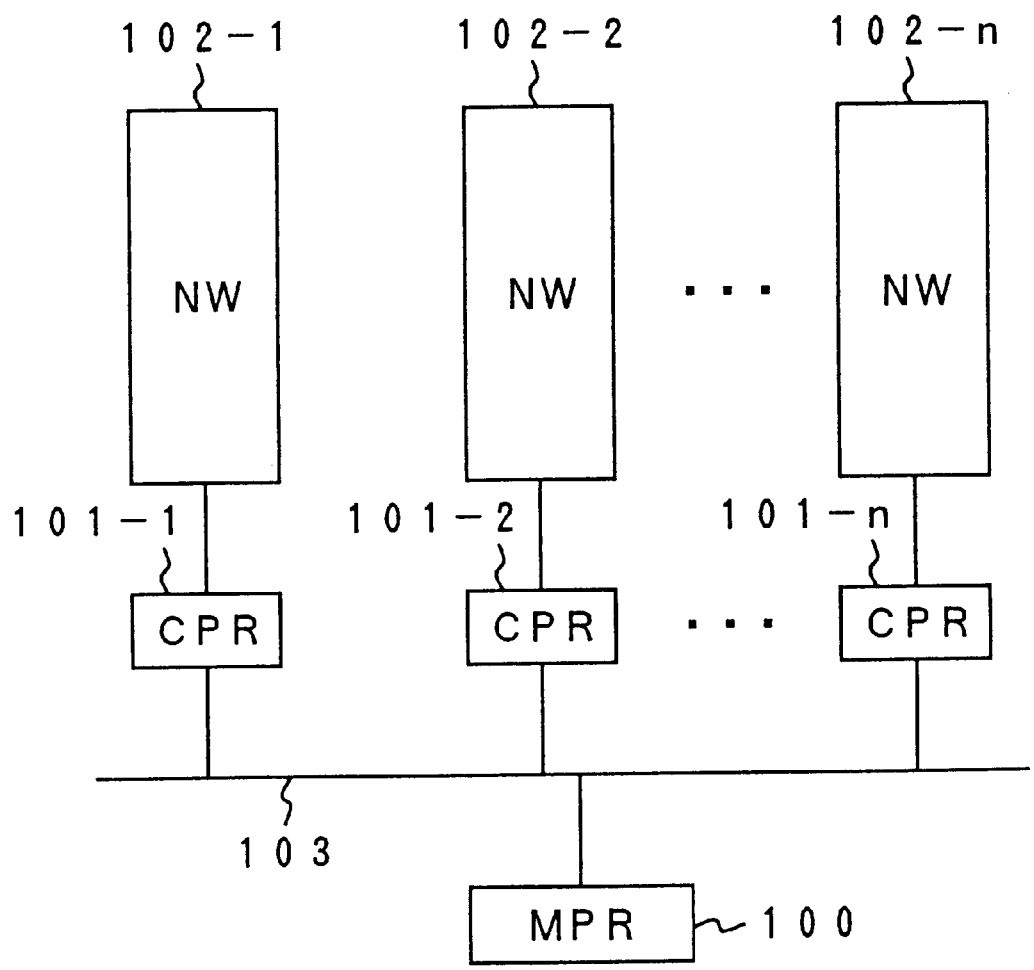
FIG. 1A is a schematic diagram of a conventional electronic switch.
Figure 1B:
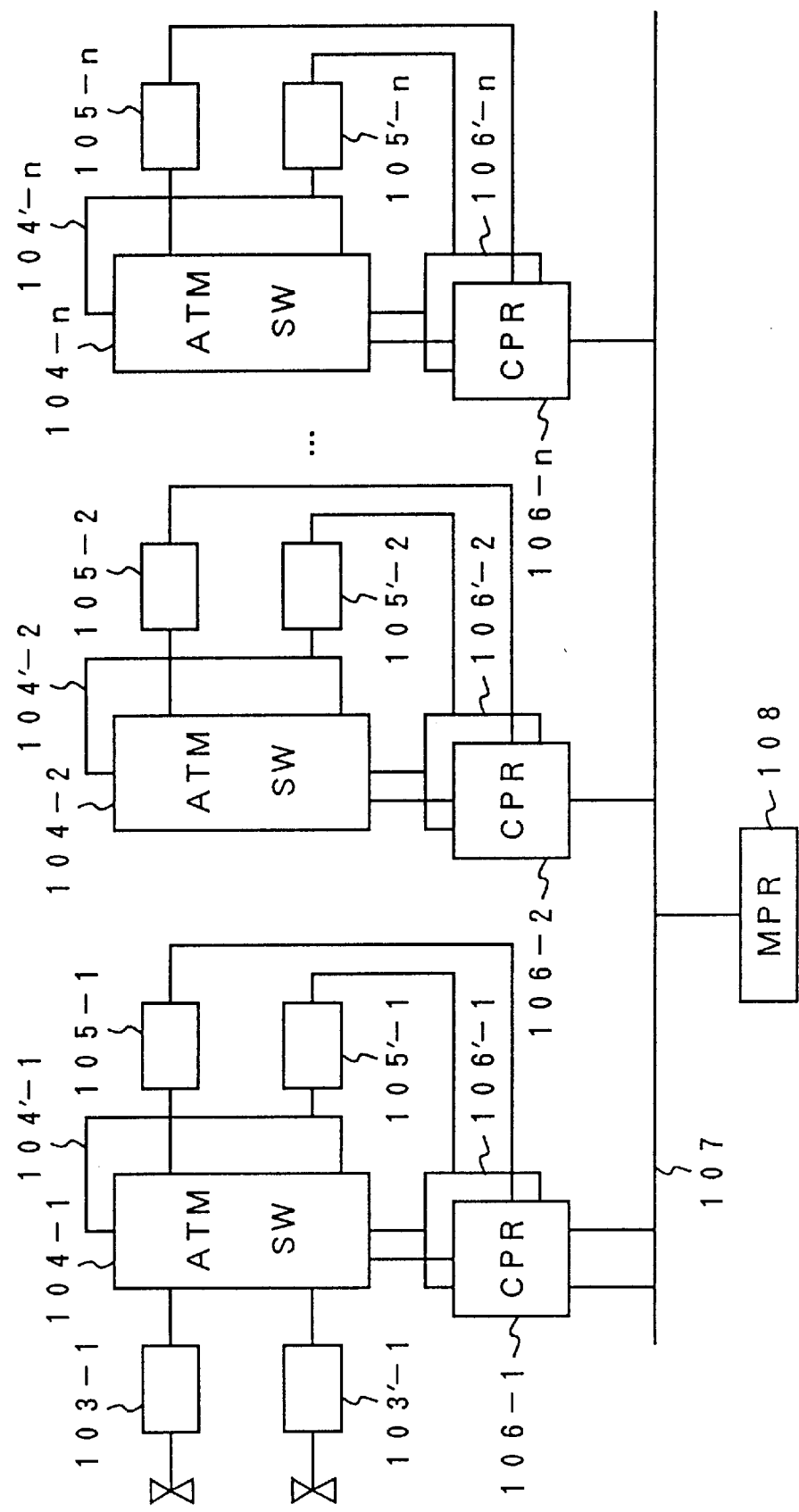
FIG. 1B is a schematic diagram of a conventional ATM switching system.

FIG. 4A is a processor status table 32 and FIG. 4B is a table illustrating status transitions. The tables of FIGS. 4A and 4B are formed in the memory or in the processor status management means 23 (see FIG. 1). The processor status table 32 is maintained by the processor status management means 23. The processor status table 32 of FIG. 4A indicates a case where the status of the processor is indicated by a one-byte ST code, the number of input/output ports which the processor can be in charge of as an active processor is indicated by an ACT code, the number of input/output ports which the processor 1 can be in charge of as a standby processor is indicated by a one-byte code SBY, and the maximum number of input/output ports which the processor 1 can be in charge of as an active processor is indicated by a MAX code, these codes being provided in addresses that correspond to the respective processor identification numbers. The processor status code ST is set to 0 when the processor 1 is not installed, to 1 when the processor 1 is being installed or uninstalled, to 2 when the processor 1 is operating normally, to 3 when there is an overload, to 4 when there is a fault or a blocking, and to 5 when a file is being updated. The processor status table 32 is not limited to such a construction but can be changed depending on the system to which it is applied.

As shown in FIG. 4B, the processor status code ST changes according to events including a start of an installation, a completion of the installation, an occurrence of an overload, a removal of an overload, an occurrence of a fault, a recovery from fault, a blocking, an unblocking, a start of a file update, a completion of a file update, a start of an uninstallation, and a completion of an uninstallation. That is, when the processor is installed, the processor status management means 23 changes the processor status code ST corresponding to that processor from 0, indicating that the processor is not: installed, to 1, indicating start of the installation. When the installation is completed the processor status code ST changes to 2, indicating a normal status. When an overload occurs, the processor status code ST changes from 2, indicating a normal status to 3, indicating an overloaded status. When the overload is gone, the processor status code ST changes to 2, indicating a normal status.

In the event of a fault, the processor status code ST changes from 2, indicating a normal status, to 4, indicating that there is a fault, or changes from 3, indicating that there is an overload, to 4, indicating that there is a fault. When the fault is removed, the processor status code ST changes from 4, indicating that there is a fault, to 2, indicating a normal status. The processor status code ST changes from 2, indicating a normal status, to 5, indicating a file update, when a file update is begun. The processor status code ST changes to 2, indicating a normal status when the file update is completed. The processor status code ST changes from 2, indicating a normal status, to 1 when an uninstallation of the processor is begun and changes to 0, indicating that the processor is not installed, when the uninstallation is completed.

The data transfer means 11 (see FIG. 2) notifies the processor status management means 23 of the input/output device 2 of events occurring in the processor 1 using the processor status change report command. The processor status management means 23 updates the processor status code ST in the processor status table 32 shown in FIG. 4A.

When the processor 1 is installed, the processor status code ST changes from 0 to 1 at the start of installation. The processor status code ST changes from 1 to 2 the installation is completed. At this stage, the installed processor is not assigned to any input/output port. Then, the processor status management means 23 obtains the number of input/output ports installed by referring to the input/output port status management means 21 and obtains an average number of input/output ports which the processors can be in charge of, based on the numbers of input/output ports and the installed processors.

The installed processor is then assigned to twice the average number of input/output ports by the correspondence table management means 22 as a standby processor. At this time, adjustment is made such that the number of input/output ports which the other processors are in charge of as a standby processor is leveled out by distributing the number of ports among the processors. That is, the number of input/output ports that the processors are in charge of as a standby processor is increased by (an average number of input/output ports that the processors took charge of before the installation)—(an average number of input/output ports that the processors are in charge of after the installation). In this case, adjustment is made such that the processors are assigned to an equal number of input/output ports on an assumption that the capability of each processor is the same. When processors with different capabilities exist, the number of input/output ports can be adjusted in proportion to the capability of each of the processors.

The correspondence table management means 22 is requested to switch the installed processor into service as an active processor for half of the input/output ports to which the installed processor is assigned as a standby processor. At this time, adjustment is made so that the number of input/output ports which the other processors are in charge of as an active processor is leveled out by distributing the number of ports among the processors. Thus, reassignment of processors to input/output ports as an active processor or a standby processor takes place when a processor is installed, causing the distribution of loads to be optimized.

When the processor 1 becomes overloaded, the input/output device 2 is notified accordingly by the data transfer means 11 of the processor 1. As a result, the processor status management means 23 updates the processor status code ST in the processor status table 32 (see FIG. 4B) to 3, indicating that there is an overload. In that case, the processor status management means 23 requests the correspondence table management means 22 to perform a switching between active processors and standby processors to reduce the number of input/output ports for the overloaded processor since the processor status code ST of 3 corresponds to a case when the number of input/output ports assigned to the target processor is too large. When the overload is removed, the processor status code ST in the processor status table 32 is updated to 2, indicating normal status.

Each processor sends the processor status change report command to the input/output device 2 at a regular period. Therefore, when the input/output device 2 fails to receive the processor status change report command for a period longer than a predetermined period, the input/output device 2 determines that a fault has occurred in the processor so that the processor status management means 23 of the input/output device 2 updates the processor status code ST in the processor status table 32 to 4, indicating that there is a fault.

The correspondence table management means 22 is called upon to switch between the active processor and the standby processor for the input/output port which was managed by the faulty processor. As a result, the input/output port which the faulty processor was in charge of as an active processor can be switched to the charge of the standby processor.

When the processor status change report command is received repeatedly at a predetermined period from the faulty processor, the input/output device 2 determines that a recovery from the fault has taken place and updates the processor status code ST in the processor status table 32 to 2, indicating a normal status. The input/output device 2 then requests the correspondence table management means 22 to perform a switching so that the processor which recovers from the fault is in charge of the processing of the input/output port as an active processor.

The processor, as well as the input/output port, can be blocked by maintenance personnel using a command. In that case, the processor status code ST in the processor status table is updated to 4. As in the case of the aforementioned provisions for a fault, the correspondence table management means 22 is requested to perform a switching between the active processor and the standby processor for the input/ output port which the blocked processor was in charge of. When an unblocking occurs, the processor status code ST in the processor status table 32 is updated to 2, and the correspondence table management means 22 is called upon to assign active and standby processors to the input/output port either by a rearrangement or according to the status prior to the blocking.

A processor file may be updated in a normal operating condition. The processor status code ST in the processor status table 32 is updated to 5 when the file update is started and a switching between the active processor and the standby processor for the input/output port which the processor whose processor file is updated was in charge of as an active processor is requested to the correspondence table management means 22. Therefore, the processor whose file is updated is switched to the standby processor mode, and the processor which was the standby processor before the file update is switched to the active processor mode so as to be in charge of processing requests with respect to the input/output port. The processor status code ST in the processor status table 32 is updated to 2 when the file update is completed and a switching between the active processor and the standby processor for half the number of the input/output ports which this processor was taking charge of as a standby processor is requested to the correspondence table management means 22.

Uninstallation of the processor from the system can only be performed while the processor is in a blocked state. The processor status code ST in the processor status table 32 changes to 1 when uninstallation is started. When the uninstallation is completed, the status of the processor is changed to "uninstalled" so that the processor status code ST changes to 0. The correspondence table management means 22 is requested to remove the registration of that processor as a standby processor for the input/output port to which this processor was assigned as a standby processor, when the processor is uninstalled. The correspondence table management means 22 sequentially assigns, to the input/output port for which the registration of the standby processor is removed, remaining processors as a standby processor so that the number of input/output ports that the processors are assigned to is level as a whole.

FIG. 5A shows a correspondence table 33 and FIG. 5B shows a processor-specific input/output port status table 34. The correspondence table 33 shown in FIG. 5A is formed in the memory (not shown) or in the correspondence table management means 22 and controlled by the correspondence table management means 22. The active processor identification number (upper) and standby processor identification number (lower) are registered in addresses corresponding to the input/output port numbers. "0" indicates that there is no processor available to be in charge of the input/output port. The active processor identification number and the standby processor identification number may be specified by 32-bit words registered in addresses corresponding to the port numbers.

The correspondence table management means 22 possesses the function of managing backup data of the correspondence table 33, initializing the table 33, updating the content of the table 33, and referring to the table 33. Update of the backup data can be performed in response to a command issued by the maintenance personnel. Therefore, when the input/output device 2 is initialized and enters the operable status, the correspondence table 33 is initialized so that the backup data is set therein. The installed processors are notified accordingly by the data transfer means 24 using the correspondence table change notification command. Allocation of the processors to the input/output ports is performed so that distributed load processing can be executed.

Switching between the active processor and the standby processor and any change in the assignment can easily be attained by changing the active processor identification number and the standby processor identification number in the correspondence table 33. For instance, when switching between the active processor and the standby processor for a designated input/output port is to occur, the active processor identification number associated with the port number of the input/output port is changed to the previous standby processor identification number and the standby processor identification number is changed to the previous active processor identification number.

The processor-specific input/output port status table 34 of FIG. 5B is formed in the port status management means 12 of the processor 1 or in the memory (not shown) and controlled by the port status management means 12. In the table 34 of FIG. 5B, the 4 bits S2 for status display are provided in addresses each assigned to the input/output port number [$=8\times j+(i/4)$]. The status display bit S2=0 indicates that the input/output port is not installed or the processor is not in charge of the input/output port. The status display bit S2=1 indicates that the processor is in charge of the input/ output port as an active processor. The status display bit S2=2 indicates that the processor is in charge of the input/ output port as a standby processor. The status display bit S2=3 indicates that the processor is in charge of the input/ output port as an active processor but the input/output port is either faulty or in a blocked status. The status display bit S2=4 indicates that the processor is in charge of the input/ output port as a standby processor but the input/output port is either faulty or in a blocked status.

Figure 6A:
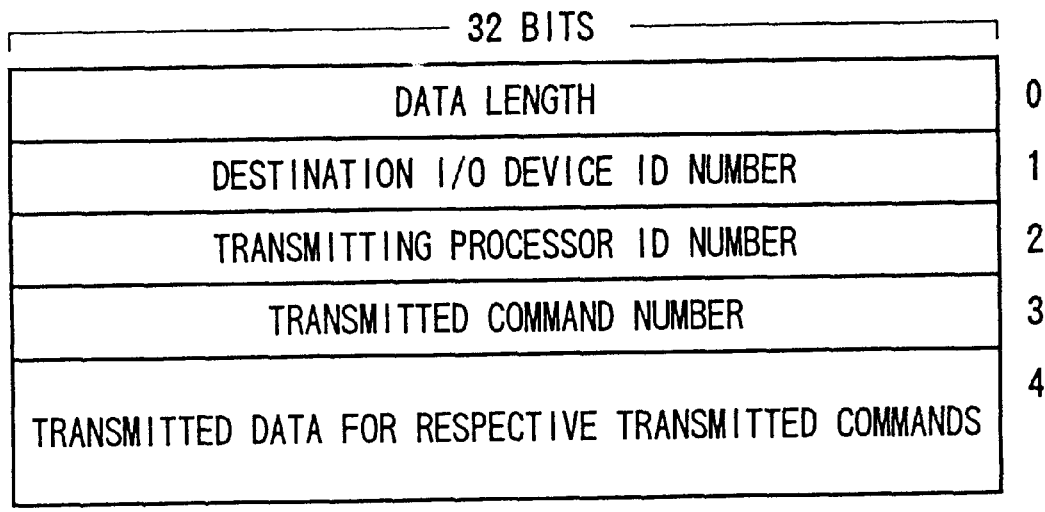
FIG. 6A shows a format of data transmitted from a processor to an input/output device.

FIG. 6A shows a format of data transmitted from the processor 1 to the input/output device 2. It is assumed that one word is composed of 32 bits. The transmitted data format of FIG. 6A consists of fields for a data length, a destination input/output device identification number, a transmitting processor identification number, a transmitted command number, and transmission data.

Figure 6B:
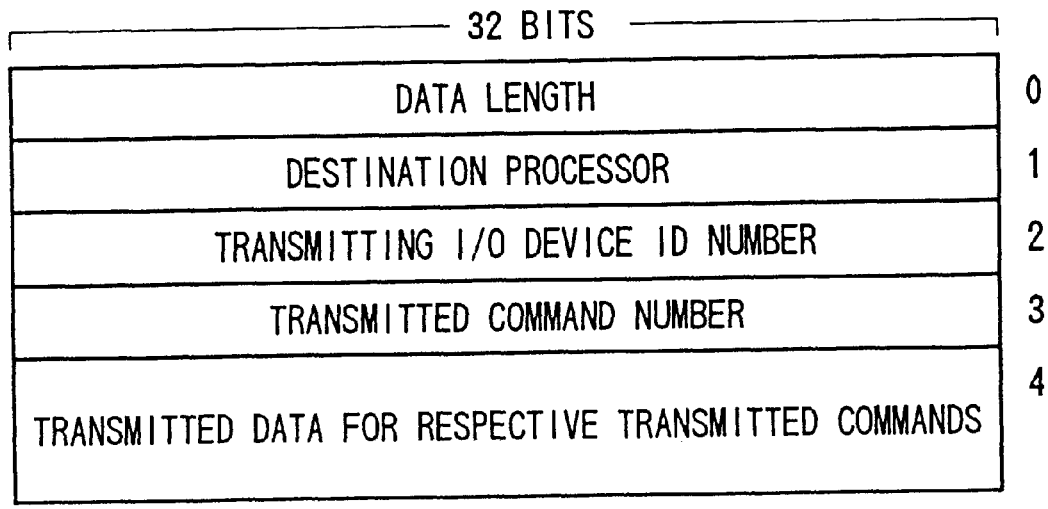
FIG. 6B shows a format of data transmitted from an input/output device to a processor.

FIG. 6B shows a format of data transmitted from the input/output device 2 to the processor 1. The transmitted data format of FIG. 6B includes fields for a data length, a destination processor identification number, a transmitting input/output device identification number, a transmitted command number, and transmission data.

FIG. 7A shows a data input command supplied to the input/output port. The command consists of fields for a data length, a destination input/output device identification number, a transmitting processor identification number, a transmitted command number, and an input/output port number. FIG. 7B shows a response to the data input command. The response consists of fields for a data length, a destination processor identification number, a transmitting input/output device identification number, a transmitted command number, an input/output port number, an input result, an input data length, and input data.

FIG. 8A shows a data output command supplied to the input/output port. The command consists of fields for a data length, a destination input/output device identification number, a transmitting processor identification number, a transmitted command number, an input/output port number, an output data length, and output data. FIG. 8B shows a response to the data output command. The response consists of fields for a data length, a destination processor identification number, a transmitting input/output device identification number, a transmitted command number, an input/output port number, and an output result.

FIG. 9A shows an input/output port status change report command which consists of fields for a data length, a destination processor identification number, a transmitting input/output device identification number, a transmitted command number, and an input/output port status table. This input/output port status change report command is used by the input/output the port status management means 21 to notify the processor of a change in the input/output port, such as an installation of an input/output port, an uninstallation thereof, a fault, and a recovery from the fault, etc.

FIG. 9B shows a response to the input/output port status change report command consisting of fields for a data length, a destination input/output device identification number, a transmitting processor identification number, a transmitted command number, and a received result. The processor which receives the input/output port status change report command shown in FIG. 9A sends this input/output port status change report command response to the input/output device.

FIG. 10A shows a processor status change report command which consists of fields for a data length, a destination input/output device identification number, a transmitting processor identification number, a transmitted command number and a processor status. The processor status change report command is transmitted by the processor status reporting means 13 via the data transfer means 11 in order to report an installation of a processor, a shift to an overloaded status, a removal of the overloaded status, an occurrence of a fault, a recovery from the fault, a file update or an uninstallation of a processor. The processor status change report command is sent to the input/output device at regular intervals to indicate the normality of the processor may include the content indicating that there is no change.

FIG. 10B shows a response to a processor status change report command consisting of fields for a data length, a destination processor identification number, a transmitting input/output device identification number, a transmitted command number, and a received result. FIG. 10C shows a correspondence table change report command consisting of fields for a data length, a destination processor identification number, transmitting input/output device identification number, a transmitted command number and a content of the table. When an event such as an installation or uninstallation of an input/output port or a processor, an occurrence of a fault or a recover from a fault occurs, the correspondence table change report command is sent by the correspondence table management means 22 to the processor in order to report a change in the correspondence between the input/output ports and the active processors shown in the correspondence table 33 (see FIG. 5), the change being specified in the "content of the table" field.

FIG. 11A shows a response to the correspondence table change report command. The response consists of fields for a data length, a destination input/output device identification number, a transmitting processor, a transmitted command number and a received result. The correspondence table change report command is sent by the processor to the input/output device in response to the correspondence table change report command shown in FIG. 10C.

FIG. 11B shows an input/output port status inquiry command consisting of fields for a data length, a destination input/output device identification number, a transmitting processor identification number, a transmitted command number and a received result. FIG. 11C shows a response to the input/output port status inquiry command. The response consists of fields for a data length, a destination processor identification number, a transmitting input/output device identification number, a transmitted command number and an input/output port status table.

When the processor sends the input/output port status inquiry command as shown in FIG. 11B to the input/output port status management means 22 of the input/output device, the processor can be notified of the content of the input/output port status table 31 managed by the input/output port status management means 21 by receiving the response as shown in FIG. 11C.

FIG. 12A shows a processor status inquiry command consisting of fields for a data length, a destination processor identification number, a transmitting input/output device identification number and a transmitted command number. FIG. 12B shows a response to the processor status inquiry command. The response consists of fields for a data length, a destination input/output device identification number, a transmitting processor identification number, a transmitted command number and a processor status. The processor status inquiry command of FIG. 12A is sent from the input/output device to the processor in order to inquire as to the status of the processor. The response of FIG. 12B is used to notify the input/output device of the processor status.

FIG. 12C shows a correspondence table inquiry command consisting of fields for a data length, a destination input/output device identification number, a transmitting processor identification number, a transmitted command number and a content of the correspondence table. FIG. 12D shows a response to the correspondence table inquiry command. The response consists of fields for a data length, a destination processor identification number, a transmitting input/output identification number, a transmitted command number and a content of the correspondence table. The correspondence table inquiry command of FIG. 12C is sent from the processor to the input/output device in order to inquire about the content of the correspondence table 33 specifying the active processor and the standby processor for that input/output port. In return, the response of FIG. 12D is provided to the processor.

FIG. 13 lists commands according to the present invention and destinations thereof. "Receiving device" entries specify whether the command is sent to the input/output device or the processor. "Destination" entries specify the means provided in the receiving device that actually receives the command. For example, data supplied via the input/output port is transferred to the input/output port access means 25 of the input/output device 2. Data supplied via the input/output port is transferred to the input/output port specified by the input/output port access means 25.

The input/output port status change report command shown in FIG. 9A is forwarded to the input/output port status management means 12 of the processor. The processor status change report command shown in FIG. 10A is forwarded to the processor status management means 23 of the input/output device 2. The correspondence table change report command shown in FIG. 10C is forwarded to the port status management means 12 of the processor 1.

The input/output port status inquiry command shown in FIG. 11B is forwarded to the input/output port status management means 21 of the input/output device 2. The processor status inquiry command shown in FIG. 12A is forwarded to the processor status reporting means 13 of the processor 1. The correspondence table inquiry command shown in FIG. 12C is forwarded to the correspondence table management means 22 of the input/output device 2.

Figure 14:
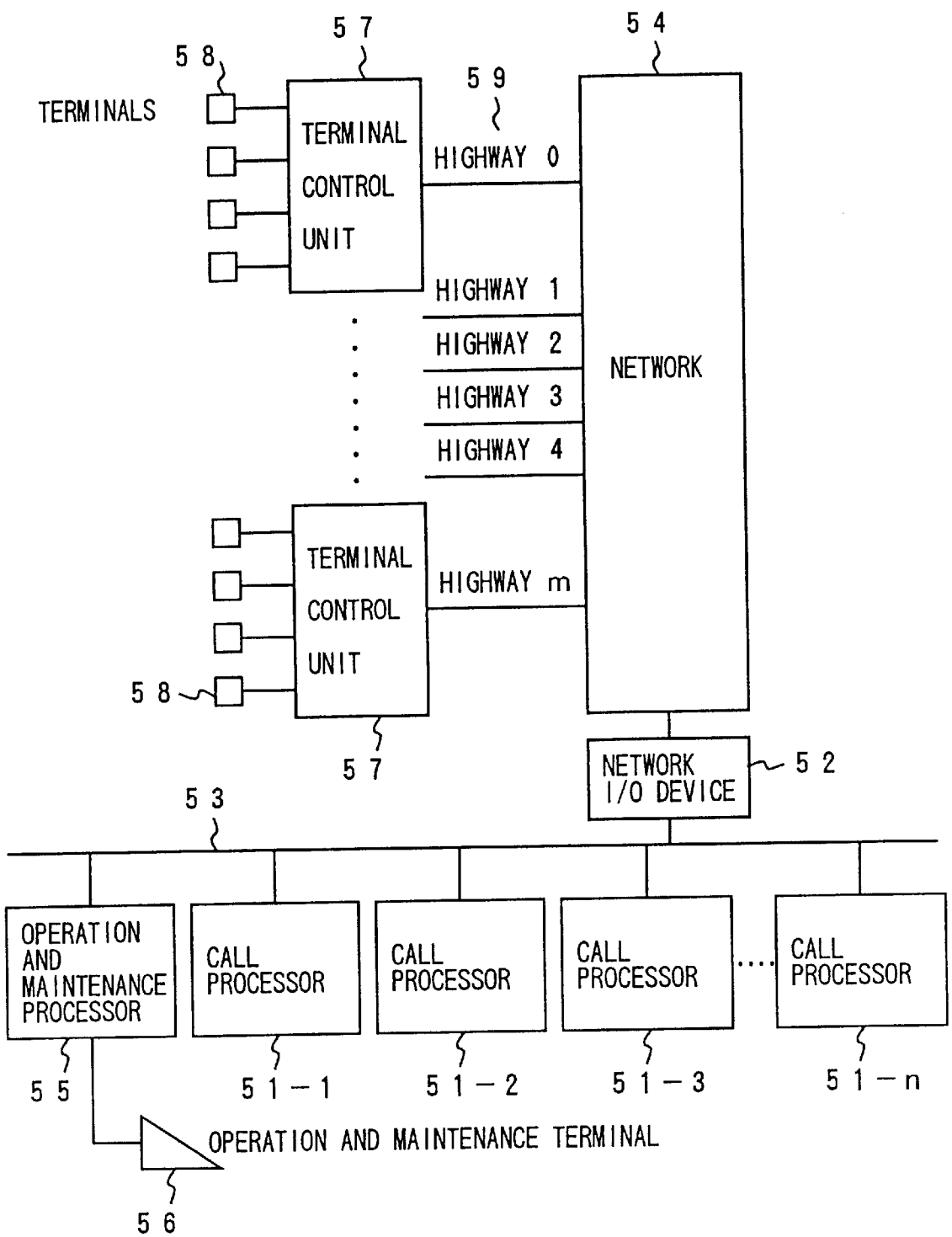
FIG. 14 shows an electronic switch to which the present invention is applied.

FIG. 14 shows an electronic switch to which the present invention is applied. The electronic switch includes call processors 51-1–51l-n, a network input/output device 52, a bus 53, a network 54, an operation and maintenance processor 55, an operation and maintenance terminal 56, a terminal control unit 57, a terminal 58 and highways 59 (0–m). The call processors 51-1–51-n correspond to the processor 1 of FIG. 2 and the network input/output device 52 corresponds to the input/output device 2 of FIG. 2. Highways 59 (0–m) correspond to the input/output ports of the input/output device.

The network 54 is composed, for instance, of timesharing switches so as to connect between the terminals 58 such as the telephone terminals according to the time slot exchange scheme. The terminal controllers 57 are connected to each other via two or more highways 0–m, and the terminal 58 is connected to each of the terminal controllers 57. The network 54 is controlled by the call processors 51-1–51-n via the network input/output device 52. Each of the call processors 51-1–51-n is assigned to the respective one of the highways 0–m as an active processor or a standby processor.

A request for a connection issued by the terminal 58 is forwarded via the network input/output device 52 to the active call processor in charge of the highway with which the terminal 58 requesting the connection is connected. The active call processor requests the network input/output device 52 to allow the requesting terminal to read information relating to the destination of the requested connection. When the information has been read, the active call processor requests the network input/output device 52 to allow the requesting terminal to send a dial tone. The active call processor then requests a call processor in charge of the highway specified by the read information to call the requested terminal. The call processor in charge of the requested terminal requests the network input/output device 52 to forward the dial tone to the requested terminal.

Upon receiving a response from the requested terminal via the network input/output device 52, the call processor forwards the response to the call to the processor in charge of the requesting terminal. The call processor in charge of the requesting terminal requests the network input/output device 52 to set up a communication path between the requesting terminal and the requested terminal.

The network 54 is controlled accordingly so that the communication path between the requesting terminal and the requested terminal is properly set up.

The processor in charge of the requesting terminal requests the network input/output device 52 to monitor a clear request from the requesting terminal. The call processor in charge of the requested terminal requests the network input/output device 52 to monitor a clear request from the requested terminal. When the call processor in charge of the requesting terminal or the call processor in charge of the requested terminal receives the clear request from the requesting terminal or the requested terminal via the network input/output device 52, the call processor receiving the clear request instructs the network input/output device 52 to cancel the communication path between the requesting terminal and the requested terminal. As a result, the communication path formed in the network 54 is released.

FIG. 15 shows the input/output port status table 31, the processor status table 32, the correspondence table 33 and the processor-specific input/output port status tables 34-1, 34-2. It is assumed that the call processors 51-1 and 51-2 are installed and denoted as the processors 1 and 2. Also, it is assumed that the highways (input/output ports) 0 through 3 are installed. The network input/output device 52 corresponds to the input/output device in the earlier description.

Referring to the input/output port status table of FIG. 15, the entry "2" at the extreme right indicates that the highway 0 is in a normal operating condition. The highways 1 through 3 are also indicated as being in a normal operating condition. The processor status table 32 of FIG. 15 includes the ST code, the ACT code, the SBY code and the MAX code. As has also been described with reference to FIG. 4, the status of the processor is indicated by the one-byte ST code, the number of input/output ports which the processor can be in charge of as an active processor is indicated by the ACT code, the number of input/output ports which the processor can be in charge of as a standby processor is indicated by the one-byte code SBY, and the maximum number of input/output ports which the processor can be in charge of as an active processor is indicated by the MAX code. In the case of the processor status table 32 of FIG. 15, the processors 1 and 2 are in a normal condition according to the ST code of 2, the number of highways (input/output ports) that the processors 1 and 2 are in charge of as an active system is 2 according to the ACT code of 2, the number of highways that the processors 1 and 2 are in charge of as a standby processor is 2 according to the SBY code of 2, and the maximum number of highways that the processors 1 and 2 may be in charge of as an active processor is 4 according to the MAX code. All "0" entries for the processors 3 and 4 means that these processors are not installed.

The correspondence table 33 registers the active processor identification number and the standby processor identification number for respective port (highway) numbers. The correspondence table 33 of FIG. 15 indicates that the processor 1 is an active processor and the processor 2 is a standby processor for the highway 0. For the highway 1, the processor 2 is an active processor and the processor 1 is a standby processor. For the highway 2, the processor 1 is an active processor, and the processor 2 is a standby processor. For the highway 3, the processor 2 is an active processor and the processor 1 is a standby processor. Since the highway 4 is not installed, no processor is in charge of the highway 4.

As has already been described with reference to FIG. 5B, the processor-specific input/output port status table specifies status of the processor with respect to each of the input/output ports. The processor-specific input/output port status table 34-1 for the processor 1 indicates that the processor 1 is an active (the rightmost entry "1") processor for the highway 0, a standby ("2") processor for the highway 1, an active ("1") processor for the highway 2 and a standby ("2") processor for the highway 3. In other words, the processor 1 is in charge of the highways 0 and 2 as an active processor and in charge of the highways 1 and 3 as a standby processor. The table 34-2 shows that the processor 2 is a standby ("2") processor for the highway 0, an active ("1") processor for the highway 1, a standby ("2") processor for the highway 2 and an active ("1") processor for the highway 3.

It is now assumed that the highway 4 is to be installed. At the start of the installation, the input/output port status table 31 is as shown in FIG. 16. More specifically, the code "1" is provided in a fifth area reserved for the highway 4, indicating that the highway 4 is being installed or uninstalled. The processor status table 32, the processor-specific input/output port status tables 34-1 and 34-2 remain unchanged.

When the installation of the highway 4 is completed, the code "2" is provided for the highway 4 in the input/output port status table 31, indicating that the highway 4 is being used in the active system. At this state, no processor is assigned to the highway 4 so that the input/output port status management means 21 (see FIG. 2) issues an inquiry to the processor status management means 23 to inquire about the status of the processors.

The processor status table 32 maintained by the processor status management means 23 is referred to obtain the maximum number MAX of the input/output ports that the processor can be in charge of and the number of input/output ports ACT that the processor can be in charge of as an active processor. The correspondence table 33 is updated based on the obtained information. More specifically, the margin of operability for each of the processors is determined so that the processor with the largest margin of operability is designated as the active processor for the highway 4, and the processor with the second largest margin of operability is designated as the standby processor for the highway 4.

Since the processors 1 and 2 have the same margin of operability according to the processor status table 32 shown in FIGS. 15 and 16, the processor 1 may be assigned to the highway 4 as an active processor and the processor 2 may be assigned to the highway 4 as a standby processor. As shown in FIG. 17, the processor status table 32 is updated such that the number of highways that the processor 1 is in charge of as an active processor is changed from "2" to "3" and the number of highways that the processor 2 is in charge of as an active processor is changed from "2" to "3".

The correspondence table 33 is also updated such that the processor 1 is registered as the active processor for the highway 4 and the processor 2 is registered as the standby processor for the highway 4. The processor-specific input/output port status tables 34-1 and 34-2 for the processors 1 and 2, respectively, are also updated such that the processor 1 is designated as the active processor for the highway 4 and the processor 2 is designated as the standby processor for the highway 4.

The change in the status of the highways is indicated to the processors 1 and 2 using the input/output port status change report command as shown in FIG. 9A. In response to the input/output port status change report command, the processors 1 and 2 update the input/output port status tables 34-1 and 34-2, thus completing the assignment of the processors to the installed highway 4. As described before, the processor 1 is an active processor for the highway 4 and the processor 2 is a standby processor for the highway 4.

It is now assumed that a fault occurs in the highway 1 in a state prior to the installation of the highway 4. In other words, it is assumed that the fault occurs when the tables are as shown in FIG. 15. The input/output port status table 31 is updated such that the code "3" indicating that there is a fault is provided to replace the code "2" in the area (the second area from right) reserved for the highway 1. The table 31 is updated as shown in FIG. 18.

The input/output port status change report command notifies the processors 1 and 2 of the fault in the highway 1. Accordingly, the processors 1 and 2 update the processor-specific input/output port status tables 34-1 and 34-2, respectively. As shown in FIG. 18, the codes "3" and "4" indicating a fault are entered in the respective areas in the tables 34-1 and 34-2 reserved for the highway 1.

Another event prompting updates of the tables will now be considered. It is assumed that the processor 3 is to be installed after the highway 4 has been installed. As shown in FIG. 19, at the start of the installation, the processor status code ST for the processor 3 is set to "1" in the processor status table 32, indicating that the installation is proceeding. At this stage, the processor-specific input/output port status table 34-3 for the processor 3 has all-0 entries.

When the processor 3 has been installed, the processor status code ST for the processor 3 is updated to "2" in the processor status table 32, indicating that the processor 3 is being used as an active processor. The processor status management means 23 (see FIG. 2) assigns highways to the installed processor 3. Since 5 highways (the highways 0–4) and 3 processors (the processors 1–3) are available, an average number of highways (input/output ports) per a processor is 1–2. The processor 3 may then be in charge of 1 highway.

Assuming that the processor 3 is in charge of 1 highway, the correspondence table management means 22 (see FIG. 2) causes the processor 3 to be in charge of twice the average number of highways per a processor, as a standby processor. In this case, the processor 3 is in charge of 2 highways as a standby processor. For example, the standby processor for the highways 1 and 4 may be switched from the processor 1 to the processor 3. For one (2≈1) of the two highways 1 and 4 to which the processor 3 is assigned as the standby processor, the processor 3 is changed to the active processor. The processor 3 remains a standby processor for the highway 1.

Therefore, the tables are as shown in FIG. 20 after the installation of the processor 3. The input/output port status table 31 shows that 5 highways are being used in the active system. In the processor status table 32, the processor status code ST for the processor 3 is set to 2, indicating that the processor 3 is active. The code ACT for the processor 3 is set to 1, indicating that the number of highways that the processor 3 is in charge of as an active processor is 1. The code SBY is set to 1, indicating that the number of highways that the processor 3 is in charge of as a standby processor is 1. The code MAX is set to 4, indicating that the maximum number of highways that the processor 3 can be in charge of as an active processor is 4.

The correspondence table 33 shows that there is no change in the processors charged with the highways 0 and 2. The standby processor for the highway 1 is changed from the processor 1 to the processor 3. The standby processor for the highway 4 is changed from the processor 2 to the processor 3, whereupon a switching between the active processor and the standby processor takes place so that the processor 3 is the active processor and the processor is the standby processor.

The processor-specific input/output port status table 34-1 for the processor 1 shows that the processor 1 is: 1) an active processor for the highways 0 and 2; 2) is not in charge of the highway 1; and 3) a standby processor for the highways 3 and 4. The processor-specific input/output port status table 34-2 for the processor 2 shows that the processor 2 is: 1) a standby processor for the highways 0 and 2; 2) is an active processor for the highways 1 and 3; and 3) not in charge of the highway 4. The processor-specific input/output port status table 34-3 for the processor 3 shows that the processor 3 is: 1) not in charge of the highways 0, 2 and 3; 2) is a standby processor for the highway 1; and 3) an active processor for the highway 4. In summary, as a result of the installation, the processors 1–3 are charged with processes through the highways 0–4 in accordance with the respective settings, in the tables of FIG. 20.

Supposing that a fault occurs in the processor 1 when the contents of the tables are as shown in FIG. 20. A processor other than the processor 1 is assigned to the highway that the processor 1 was in charge of before the fault. This results, for example, in the table as shown in FIG. 21. Since the processor 1 was in charge of the highways 0 and 2 as an active processor and the processor 2 was in charge of the same as a standby processor, an active/standby switching takes place.

Therefore, the input/output port status table 31 does not change. However, the processor status table 32 shows that the ST code for the processor 1 is set to 4, indicating that the processor 1 is faulty. The code ACT is set to 0, indicating that the number of highways that the processor 1 is in charge of is 0. The code SBY is set to 4, indicating that the number of highways that the processor 1 is in charge of as a standby processor is 4. The code MAX, indicating the maximum number of highways that the processor 1 can be in charge of, remains to be set to 4.

The ST code for the processor 2 is set to 2, indicating that the processor 2 is being used as an active processor. The MAX code remains to be set to 4. However, the ACT code is set to 4, indicating that the number of highways that the processor 2 is in charge of as an active processor is 4. The code SBY is set to 0, indicating that the number of highways that the processor 2 is in charge of as a standby processor is 0. The codes for the processor 3 remain unchanged.

The correspondence table 33 shows that the active processor for the highways 0 and 2 is switched from the processor 1 to the processor 2 and the standby processor for the highways 0 and 2 is switched from the processor 2 to the processor 1. The active processor for the highway 1 remains the processor 2. However, the standby processor for the highway 1 is switched from the processor 1 to the processor 3. The active and standby processors for the highways 3 and 4 remain unchanged.

Since the fault occurs in the processor 1, the content of the processor-specific input/output port status table 34-1 for the processor 1 is undetermined. Referring to the processor-specific input/output port status table 34-2 for the processor 2, the processor 2 is: 1) an active processor for the highways 0–3; and 2) not in charge of the highway 4. The processor-specific input/output port status table 34-3 for the processor 3 shows that the processor 3 is: 1) not in charge of the highways 0, 2 and 3; 2) a standby processor for the highway 1; and 3) an active processor for the highway 4.

Figure 22:
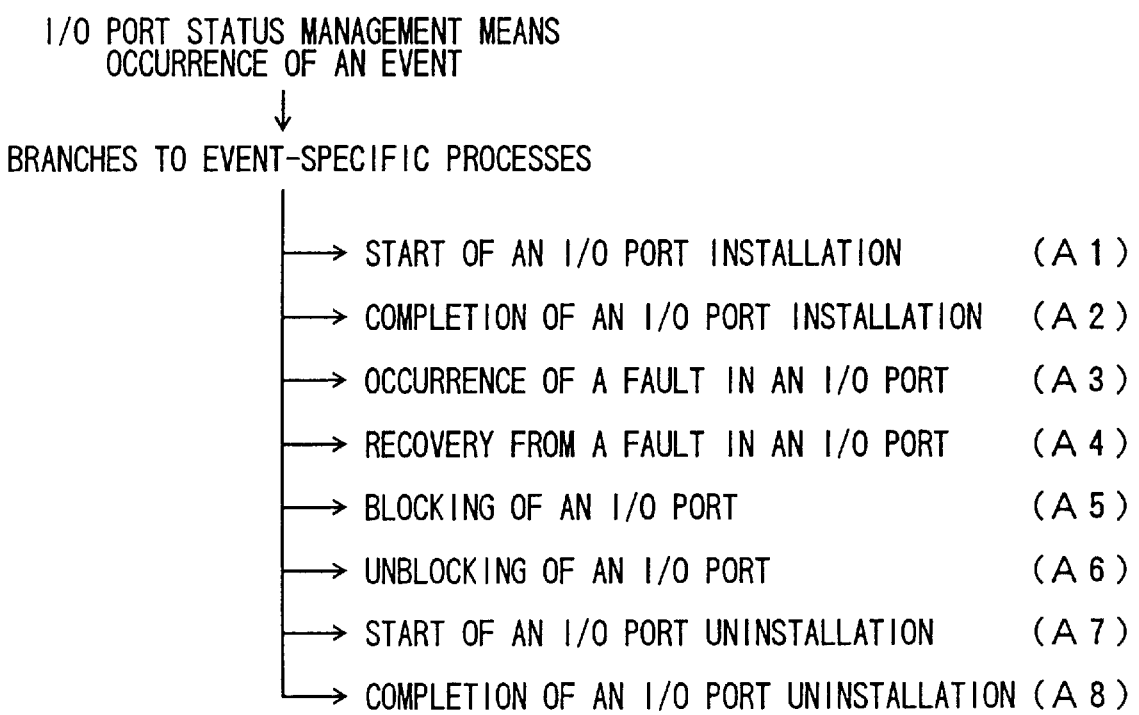
FIG. 22 is a flowchart showing how different processes are selected responsive to events occurring in an input/output port.

FIG. 22 is a flowchart showing how different processes are selected responsive to events occurring in an input/output port. The input/output port status management means 21 (see FIG. 2) causes the process flow to branch according to the type of the event that has occurred. More specifically, different processes are initiated depending on whether the event is 1) start of an input/output port installation (A1); 2) completion of an input/output port installation (A2); 3) occurrence of a fault in an input/output port (A3); 4) recovery from a fault in an input/output port (A4); 5) blocking of an input/output port (A5); 6) unblocking of an input/output port (A6); 7) start of an input/output port uninstallation (A7); and 8) completion of an input/output port uninstallation (A8).

Upon a start of the input/output port installation, a determination is made, as shown in FIG. 23, as to whether or not the status of the input/output port is set to "not installed" (A11). When the status is "installed", the event (the start of the installation) is rejected. When the status is "not installed", the status code for the input/output port is set to "1", indicating that the input/output port is being installed (see the input/output port status table 31 of FIG. 3B. Thereafter, the installation of the input/output port is carried out (A13).

Upon a completion of the installation, a determination is made as to whether the status of the input/output port is set to "being installed" (A21). If it is determined that the status is not "being installed", the event of the completion of the installation is rejected. If the status is set to "being installed", the status display bit for the input/output port is set to 2, indicating that the input/output port is used in the active system (see the input/output port status table 31) (A22). An inquiry is issued to the processor status management means 23 to inquire about the status of the processor (A23).

The active and standby processors for the installed input/output port are determined so that the number of input/output ports that the processors are in charge of as an active processor is leveled out (A24). The correspondence table management means 22 sets the active and standby processors for the installed input/output port in the correspondence table 33 (A25). The correspondence table management means 22 notifies the processors of the status of the input/output ports via the data transfer means 24, using the input/output port status change report command (A26) (see FIG. 9A).

Figure 24:
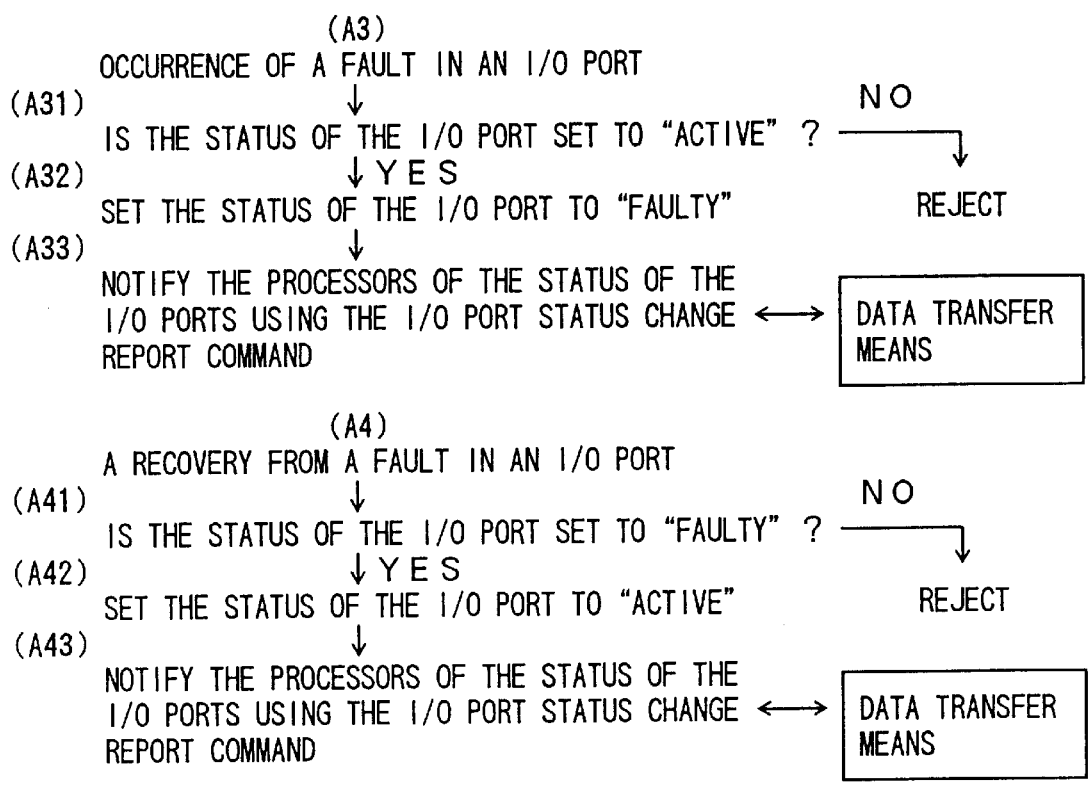
FIG. 24 is a flowchart showing processes selected responsive to events of an occurrence of and a recovery from a fault.

In the event that a fault occurs in an input/output port (A3), a determination is made, as shown in FIG. 24, as to whether the status of the input/output port is set to "active" (A31). If the status is not set to "active", the event of the fault in the input/output port is rejected. If the status is set to "active", the status display bit is set to 3, indicating that the input/output port is faulty (see the input/output port status table 31) (A32). The processors are notified of the fault in the input/output port by the input/output port status change report command (see FIG. 9A) that arrives via the data transfer means 24 (A33).

Upon a recovery from the fault in the input/output port (A4), a determination is made, as shown in FIG. 24, as to whether the status display bit is set to 3, indicating that the input/output port is faulty (A41). If the status of the input/output port is not "faulty", the event of the recovery from the fault is rejected. If the status is "faulty", the status display bit is set to 2, indicating that the input/output port is active (see the input/output port status table 31) (A42). The processors are notified of the recovery from the fault in the input/output port by the input/output port status change report command (see FIG. 9A) that arrives via the data transfer means 24 (A43).

Figure 25:
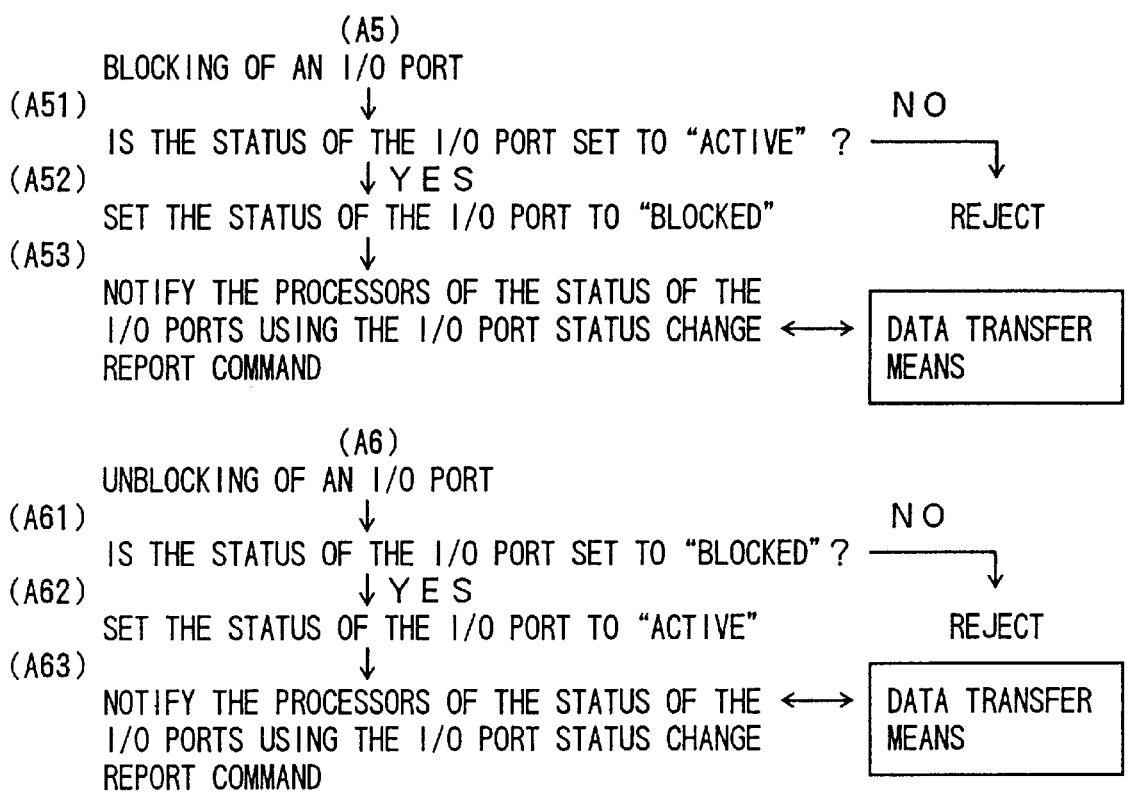
FIG. 25 is a flowchart showing processes selected responsive to events of a blocking and an unblocking of an input/output port.

Upon an occurrence of a blocking of an input/output port (A5), a determination is made, as shown in FIG. 25, as to whether the status display bit is set to 2, indicating that the input/output port is active (A51). If the status is not "active", the blocking of the input/output port is rejected. If the status is "active", the status display bit is set to 3, indicating that the input/output port is "blocked" (see the input/output port status table 31) (A52). The processors are notified of the blocking in the input/output port by the input/output port status change report command (see FIG. 9A) that arrives via the data transfer means 24 (A53).

Upon unblocking of an input/output port (A6), a determination is made, as shown in FIG. 25, as to whether the status bit is set to 3, indicating that the input/output port is blocked (A61). If the status is not set to "blocked", the event of the unblocking of the input/output port is rejected. If the status is "blocked", the status bit is set to 2, indicating that the input/output port is being used in an active system (A62). The processors are notified of the unblocking of the input/output port by the input/output port status change report command (see FIG. 9A) that arrives via the data transfer means 24 (A63).

Figure 26:
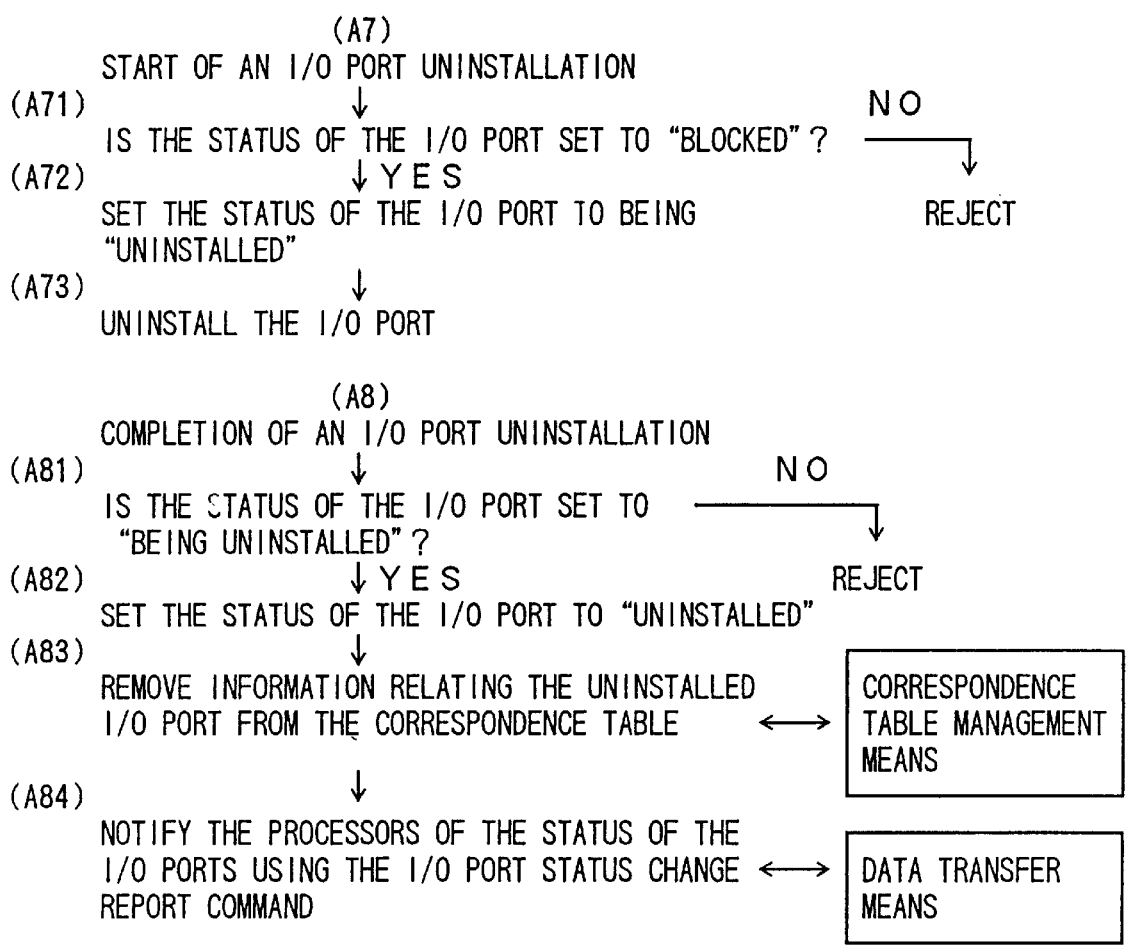
FIG. 26 is a flowchart showing processes selected responsive to events of a start and a completion of uninstallation of an input/output port.

Upon a start of uninstallation of an input/output port (A7), a determination is made, as shown in FIG. 26, as to whether the status bit is set to 3, indicating that the input/output port is blocked (A71). If the status is not "blocked", the uninstallation of the input/output port is rejected. When the status is "blocked", the status bit is set to 1, indicating that the input/output port is "being uninstalled" (see the input/output port status table 31) (A72). Thereafter, the uninstallation of the input/output port is carried out (A73).

Upon a completion of an input/output port (A8), a determination is made as to whether the status bit is set to 1, indicating that the input/output port is being uninstalled (A81). If the status is not "being uninstalled", the completion of the uninstallation is rejected. If the status is "being uninstalled", the status bit is set to 0, indicating that the input/output port is uninstalled (see the input/output port status table 31) (A82). The correspondence table management means 22 is called upon to delete an entry of the uninstalled input/output port in the correspondence table 33 (A83). The processors are notified of the completion of the uninstallation of the input/output port by the input/output port status change report command (see FIG. 9A) that arrives via the data transfer means 24 (A83).

FIG. 27 is a flowchart showing how different processes are selected responsive to events occurring in a processor. The processor status management means 23 (see FIG. 2) causes the process flow to branch according to the type of the event that has occurred. More specifically, different processes are initiated depending on whether the event is 1) start of a processor installation (B1); 2) completion of a processor installation (B2); 3) occurrence of an overload in a processor (B3); 4) removal of an overload in a processor (B4); 5) occurrence of a fault in a processor (B5); 6) recovery from a fault in a processor (B6); 7) blocking of a processor (B7); 8) unblocking of a processor (B8); 9) start of a processor file update (B9); 10) completion of a processor file update (Bb1); 11) start of a processor uninstallation (Bb2); and 12) completion of a processor uninstallation (Bb3).

Upon a start of the processor installation (B1), a determination is made as to whether the status of the processor is set to "uninstalled" (B11). If it is found that the status of the processor is installed, installation is not necessary. Therefore, the start of the processor installation is rejected. If the status bit for the processor is set to 0, indicating that the processor is not installed, the status bit in the processor status table (see FIG. 4) is set to 1, indicating that the processor is being installed (B12). Thereafter, the installation of the processor is carried out (B13).

Upon a completion of the processor installation (B2), a determination is made, as shown in FIG. 28, as to whether the status of the processor s "being installed" (B21). If the status is not "being installed", the completion of the processor is rejected. If the status is "being installed", the status bit ST for the processor in the processor status table 32 is set to 2, indicating that the processor is operating normally (B22). The input/output port status management means 21 refers to the input/output port status table 31 to determine the number of active input/output ports (B23) and also determines an average number of input/output ports per a processor based on the total number of input/output ports and the number of processors that are installed (B24).

The correspondence table management means 22 updates the correspondence table 33 such that the installed processor is in charge of twice the average number of input/output ports per a processor, as a standby processor (B24). This can be achieved by assigning the installed processor to input/output ports to which other processors was assigned as standby processor. The correspondence table management means 22 is switched between active and standby processors appropriately so that the number of input/output ports that the processors are in charge of as an active processor levels (B26).

Figure 29:
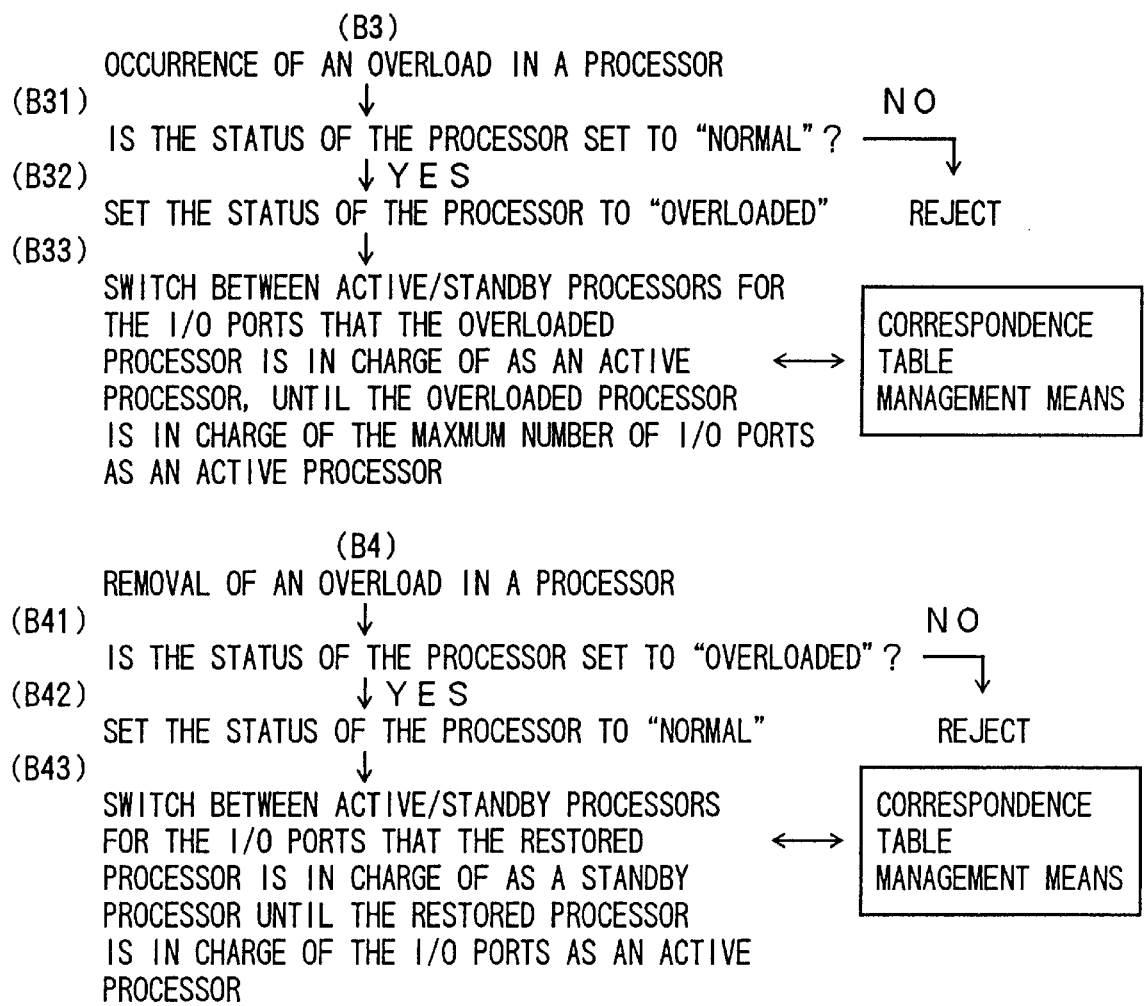
FIG. 29 is a flowchart showing processes selected responsive to events of an occurrence and a removal of an overload in a processor.

Upon an occurrence of an overload in a processor (B3), a determination is made, as shown in FIG. 29, as to whether the status of the processor is set to "normal" (B31). The processors periodically notifies the input/output devices of the maximum number of input/output ports that the processor can be in charge of as an active processor. In the event that the processor is assigned to more than the maximum number as an active processor, an overload may occur.

If it is determined in B31 that the status of the processor is "not normal", it means that the processor has already been in an abnormal condition. Therefore, the occurrence of the overload is rejected. If the status bit for the processor is set to 2, indicating "normal", the status code for the processor is set to 3, indicating that the processor is overloaded (B32). The correspondence table management means 22 switches between active and standby processors for the input/output ports that the overloaded processor is in charge of as an active processor until the overloaded processor is in charge of the maximum number of input/output ports as an active processor or until the overload is removed (B33). That is, the number of input/output ports that the overloaded processor is in charge of is reduced by assigning other processors to some of the input/output ports that the overloaded processor was in charge of as an active processor.

When the number of input/output ports that the overloaded processor is assigned to as an active processor is reduced to less than the maximum number, it means that the overload is removed. Upon a removal of the overload (B4), a determination is made, as shown in FIG. 29, as to whether the status of the processor was "overloaded" prior to the removal event (B41). If the status is not "overloaded", the removal of the overload is rejected. If the status is "overloaded", the status bit for the processor is set to 2, indicating that the processor is normal (B42). The correspondence table management means 22 switches between active and standby processors for the input/output ports that the processor restored to normal is in charge of as a standby processor until the restored processor is in charge of the maximum number of input/output ports as an active processor (B43). That is, the number of input/output ports that the restored processor is assigned to as an active processor is increased.

Upon an occurrence (B5) of or recovery (B6) from a fault in a processor, a processor is activated at intervals (B51) so as to determine whether a processor status change report is received (B52). If a processor status change report is not received, a determination is made as to whether the processor status change report is not received for a total of N consecutive intervals (B53). If the processor status change report is not received for a total of N consecutive intervals, a determination is made as to whether or not the processor status is "active" (B54). If the status of the processor is "active", it is determined that the processor is faulty since the processor fails to send the processor status change report for the N consecutive intervals (B55).

When it is determined in B52 that the processor status change report is received, a determination is made as to whether the report is received for a total of N intervals (B56). If the report is received for the N intervals, it means that the processor is operating normally. A determination is then made as to whether or not the previous status of the processor was "faulty" (B57). If the status of the processor is "faulty", a processor fault recovery process is performed (B58).

Figure 30:
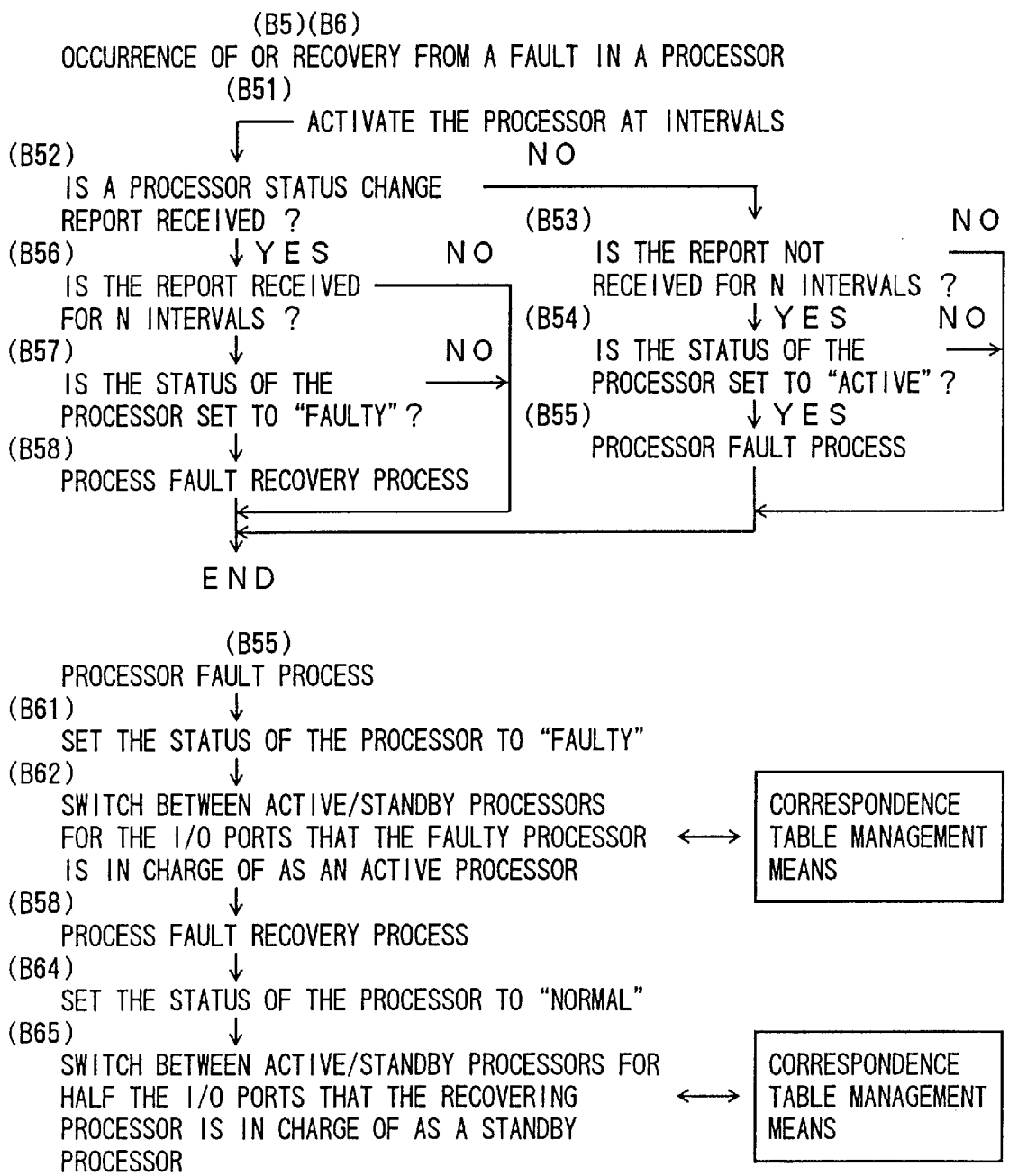
FIG. 30 is a flowchart showing processes selected responsive to events of an occurrence of or a recovery from a fault in a processor.

In the processor fault process (B55) shown in FIG. 30, the status display bit is set to 4, indicating that the processor is faulty (see the processor status table 32) (B61). The correspondence table management means 22 switches between active/standby processors for the input/output ports that the faulty processor is in charge of as an active processor (B62). More specifically, the standby port for the input/output ports that the faulty processor was in charge of as an active processor is switched to the active processor so as to handle requests via the input/output port.

In the processor fault recovery process (B58) shown in FIG. 30, the status display bit is set to 2, indicating that the processor is operating normally (see the processor status table 32) (B64). The correspondence table management means 22 switches between active/standby processors for half the input/output ports that the recovering processor is in charge of as a standby processor (B65).

Figure 31:
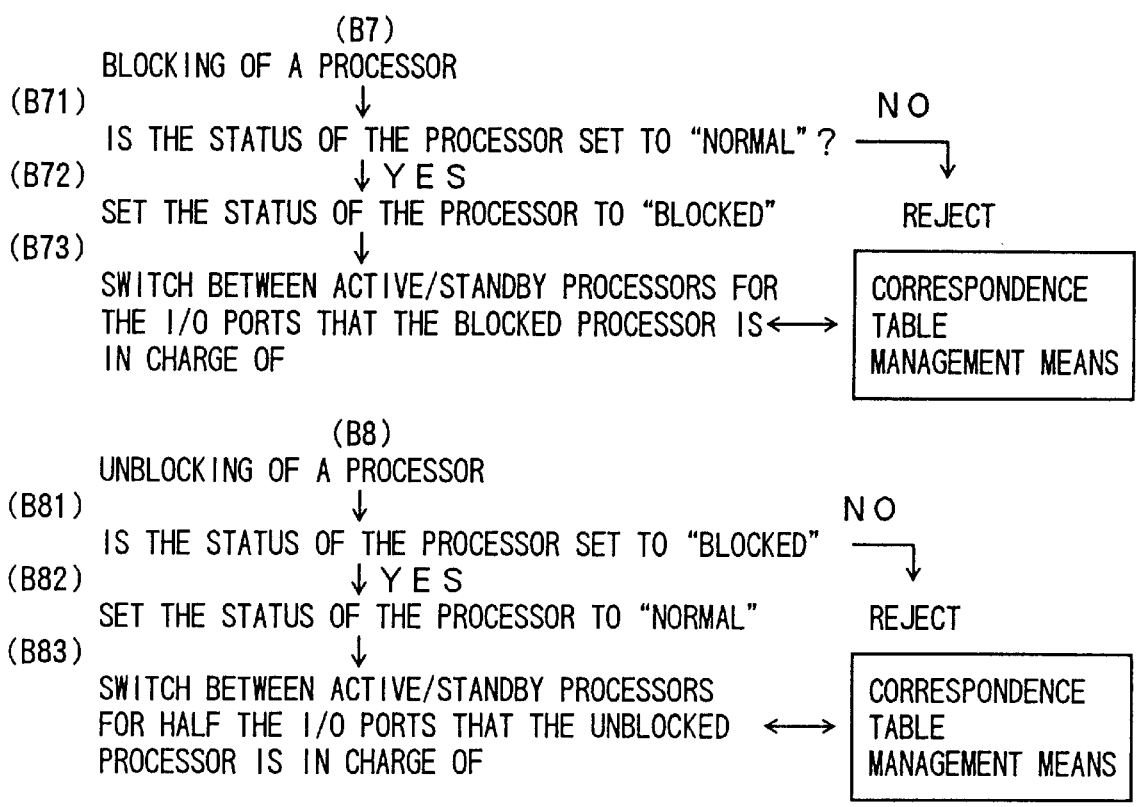
FIG. 31 is a flowchart showing processes selected responsive to events of a blocking and an unblocking of a processor.

Upon an occurrence of a blocking of a processor (B7), a determination is made, as shown in FIG. 31, as to whether the status of the processor is "normal" (B71). If the status is not "normal", it means that a fault or a blocking has already occurred. Accordingly, the occurrence of a blocking is rejected. If the status is "normal", the status of the processor is set to 4, indicating that the processor is operating normally (see the processor status table 32) (B72). As in the case of the aforementioned provisions for the occurrence of the failure, the correspondence table management means 22 switches between active and standby processors for the input/output ports that the blocked processor is in charge of as an active processor (B73).

Upon an unblocking of a processor (B8), a determination is made, as shown in FIG. 31, as to whether the status of the processor is "blocked" (B81). If the status is not "blocked", the unblocking of the processor is rejected. When the status is "blocked", the event of the unblocking is acknowledged. The status display bit for the processor is set to 2 (see the processor status table 32), indicating that the processor is operating normally (B82). The correspondence table management means 22 switches between the active and standby processors for half the input/output ports that the unblocked processor is in charge of as a standby processor (B83).

Upon a start of a processor file update (B9), a determination is made, as shown in FIG. 32, as to whether the status of the processor is "normal". If the status is not "normal", the file update is impossible so that the start of the processor file update is rejected. If the status is "normal", the status display bit for the processor is set to 5 (see the processor status table 32), indicating that the file update is proceeding (B92). The correspondence table management means 22 switches between the active and standby processors for the input/output ports that the target processor is in charge of as an active processor (B93). Thereafter, the processor file is updated (B94).

Upon a completion of the processor file update (Bb1), a determination is made, as shown in FIG. 32, as to whether or not the status of the processor is set to "file update proceeding" (Bb11). If the status is not "file update proceeding", the completion of the processor file update is rejected. If the status is "file update proceeding", the status of the processor is set to "normal" (see the processor status table 32) (Bb12). The correspondence table management means 22 switches between the active and standby processors for half the input/output ports that the target processor is in charge of as a standby processor (Bb13). More specifically, the processor file update causes the target processor to be switched to the standby processor. Upon the completion of the file update, the active/standby switching is performed for half the input/output ports that the target processor is in charge of as a standby processor so that the number of input/output ports that the target processor is in charge of as an active processor and the number of input/output ports that the target processor is in charge of as a standby processor become equal.

Upon a start of an uninstallation of a processor (Bb2), a determination is made, as shown in FIG. 33, as to whether the status of the processor is "blocked" (Bb21). If the status is not "blocked", it means that the uninstallation is prohibited so that the start of the uninstallation is rejected. If the status is "blocked", the status display bit for the processor is set to 1 (see the processor status table 32), indicating that the processor is being uninstalled (Bb22). Thereafter, the processor is uninstalled (Bb23).

Upon a completion of a processor uninstallation (Bb3), a determination is made, as shown in FIG. 33, as to whether the status of the processor is "being uninstalled" (Bb31). If the status is not "being uninstalled", the completion of the processor uninstallation is rejected. If the status is "being uninstalled", it means that the processor uninstallation is completed. The status display bit for the processor is then set to 1 (see the processor status table 32), indicating that the processor is uninstalled (Bb32). The correspondence table management means 22 sequentially assigns, as a standby processor, processors other than the uninstalled processor to the input/output ports that the uninstalled processor was in charge of as a standby processor (Bb33).

Figure 34A:
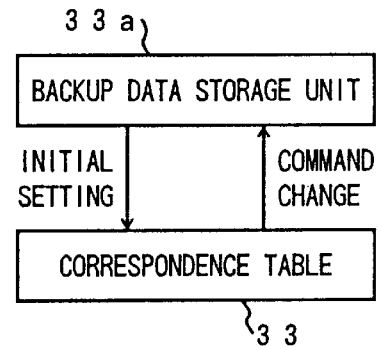
FIG. 34A is a flowchart for processes executed by correspondence table management means.

FIG. 34A is a flowchart for processes executed by the correspondence table management means. The correspondence table management means 22 includes the correspondence table 33 and the backup data storage unit 33a. According to the initial setting in the input/output device (C1), the backup data storage unit 33a transfers backup data to the correspondence table 33 (C2). The content of the correspondence table 33 is reported to all the processors (C3). The content of the correspondence table 33 may be changed using a command (C4). The content of the correspondence table 33 is copied to the backup data storage unit 33a on a periodical basis and also whenever there is a change in the content (C5). The initial setting of the correspondence table 33 may take place when the system is restarted, for example, so that the load is distributed to the processors according to the correspondence table 33.

Figure 34B:
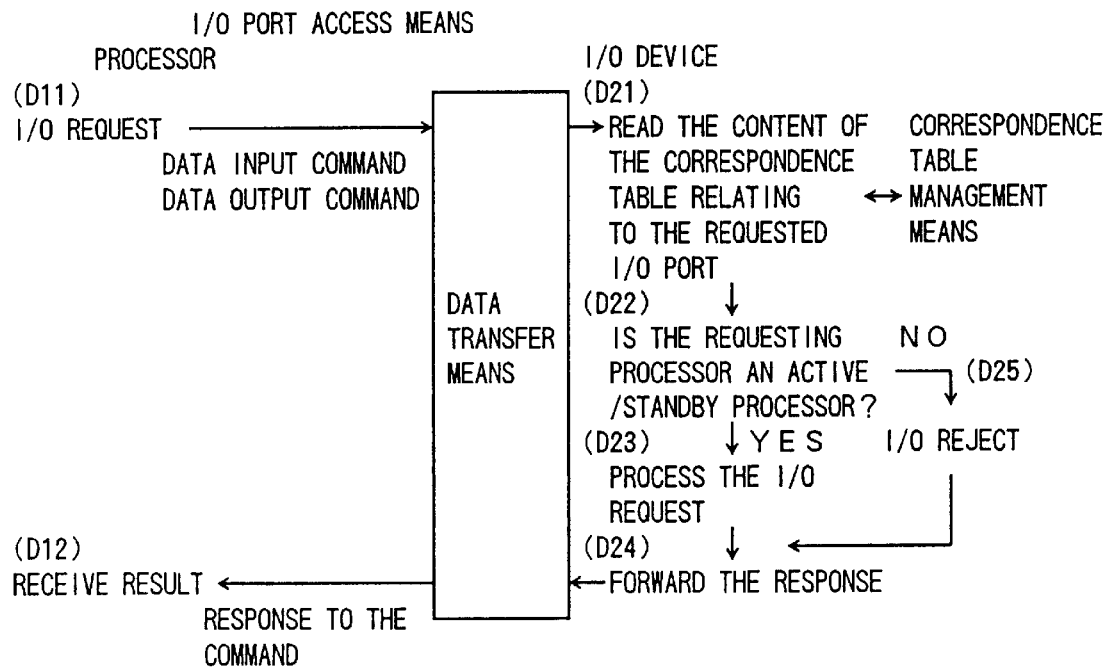
FIG. 34B is a flowchart for processes executed by the input/output port access means of the input/output device.

FIG. 34B is a flowchart for processes executed by the input/output port access means 25 of the input/output device 2 (see FIG. 2). Upon receiving input/output requests such as a data input command or a data output command via the data transfer means 11 and 24 (D11), the input/output port access means 25 reads the content of the correspondence table relating to the requested input/output port via the correspondence table management means 22 (D21). A determination is made as to whether the requesting processor is operating either as an active processor or a standby processor (D22). If the requesting processor is neither an active processor nor a standby processor, the input/output request is rejected (D25). If the requesting processor is an active processor or a standby processor, the input/output request is processed (D23), and the response to the command is forwarded (D24). As a result, the requesting processor receives the result in the form of a response to the command via the data transfer means 11 and 24.

FIGS. 35A and 35B are flowcharts for processes executed by the data transfer means 11 and 24. Referring to FIG. 35A describing the data transmission (D1), the data transfer means 11 and 24 sends one of the commands as shown in FIGS. 9A–12D on the communication bus (E2). Referring to FIG. 35B describing the data reception (E3), the data transfer means checks the command code received (E4) and activates means that corresponds to the command code received (E5).

FIG. 36A is a flowchart for a process executed by the processor status reporting means. The processor status reporting means 13 of the processor 1 (see FIG. 2) is periodically activated (F1) so as to edit the processor status (F2) and sends the processor status change report command as shown in FIG. 10A via the data transfer means 11 (F3).

FIG. 36B is a flowchart for a process executed by the port status management means 12. Upon receiving an input/output port status change report command as shown in FIG. 9A (G1), the port status management means 12 accordingly updates the status display bits S2 in the processor-specific input/output port status table 34 (G2).

When the port status management means 12 receives a correspondence table change report command (see FIG. 10C) (G3), the port status management means 12 appropriately switches between the active and standby processors for the input/output port that the processor is in charge of (G4). More specifically, any change in the correspondence between the processors and the input/output ports specified in the correspondence table 33 in the input/output device 2 is received in the form of the correspondence table change report command. The correspondence table change report command may require that the processor receiving that command be switched from the active processor to the standby processor or vice versa with respect to the target input/output port. It may also require the processor to be put in charge of an input/output port as an active processor or a standby processor. In any event, the port status management means 12 updates the processor-specific port status table 34 in accordance with the received correspondence table change report command.

Figure 37:
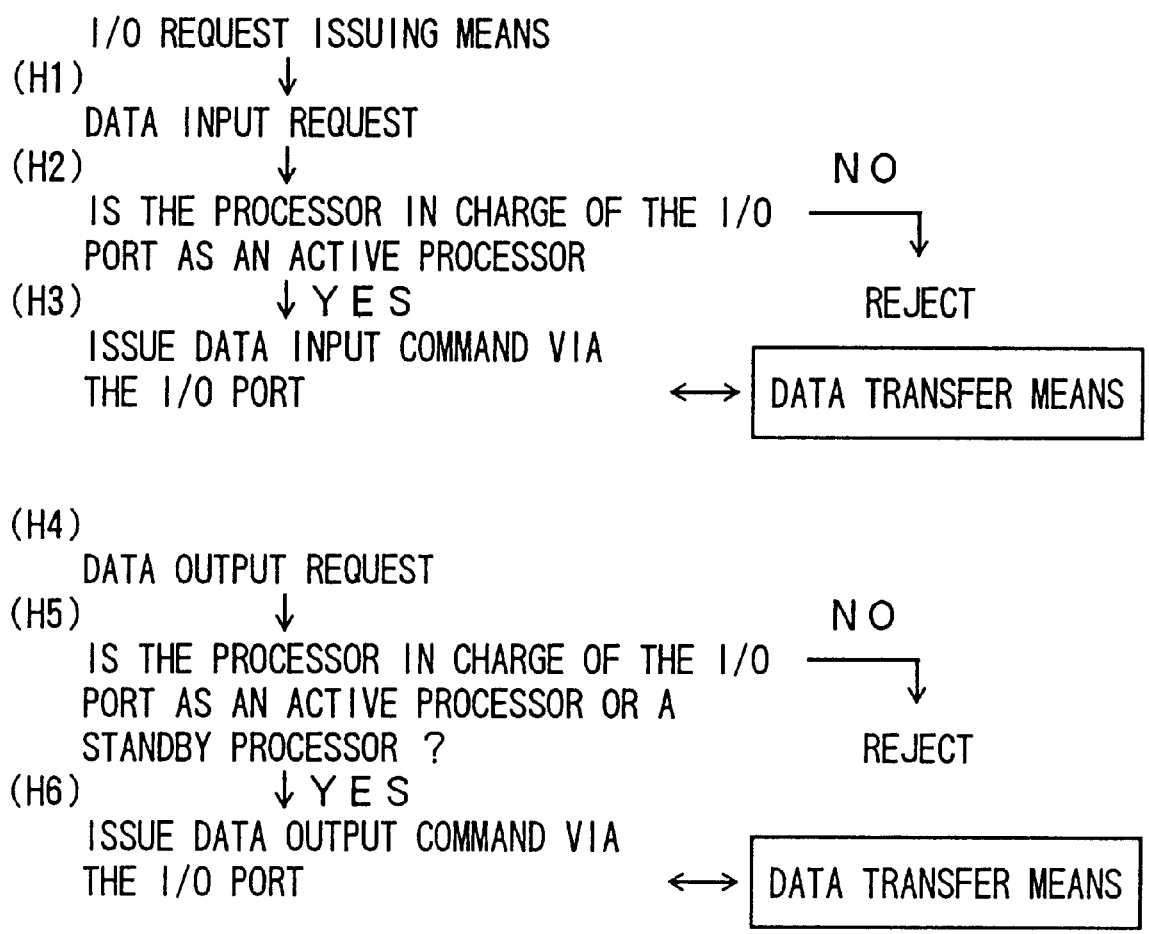
FIG. 37 shows flowcharts for processes executed by the input/output request issuing means of the processor.

FIG. 37 shows flowcharts for processes executed by the input/output request issuing means 14 of the processor 1. When a data input request with respect to an input/output port arises (H1), a determination is made as to whether or not the processor is in charge of that input/output port as an active processor (H2). If the processor is not in charge as an active processor, the request is rejected. If the processor is in charge as an active processor, the input/output request issuing means 14 issues a data input command as shown in FIG. 7A via the input/output port (H3). The data input command is then forwarded by the data transfer means 11.

When a data output request with respect to an input/output port arises (H4), a determination is made as to whether the processor is in charge of that input/output port as an active processor or a standby processor (H5). If the processor is not in charge, the request is rejected. If the processor is in charge, the input/output request issuing means 14 issues the data output command as shown in FIG. 8A (H6). The data output command is then forwarded by the data transfer means 11.

Figure 38:
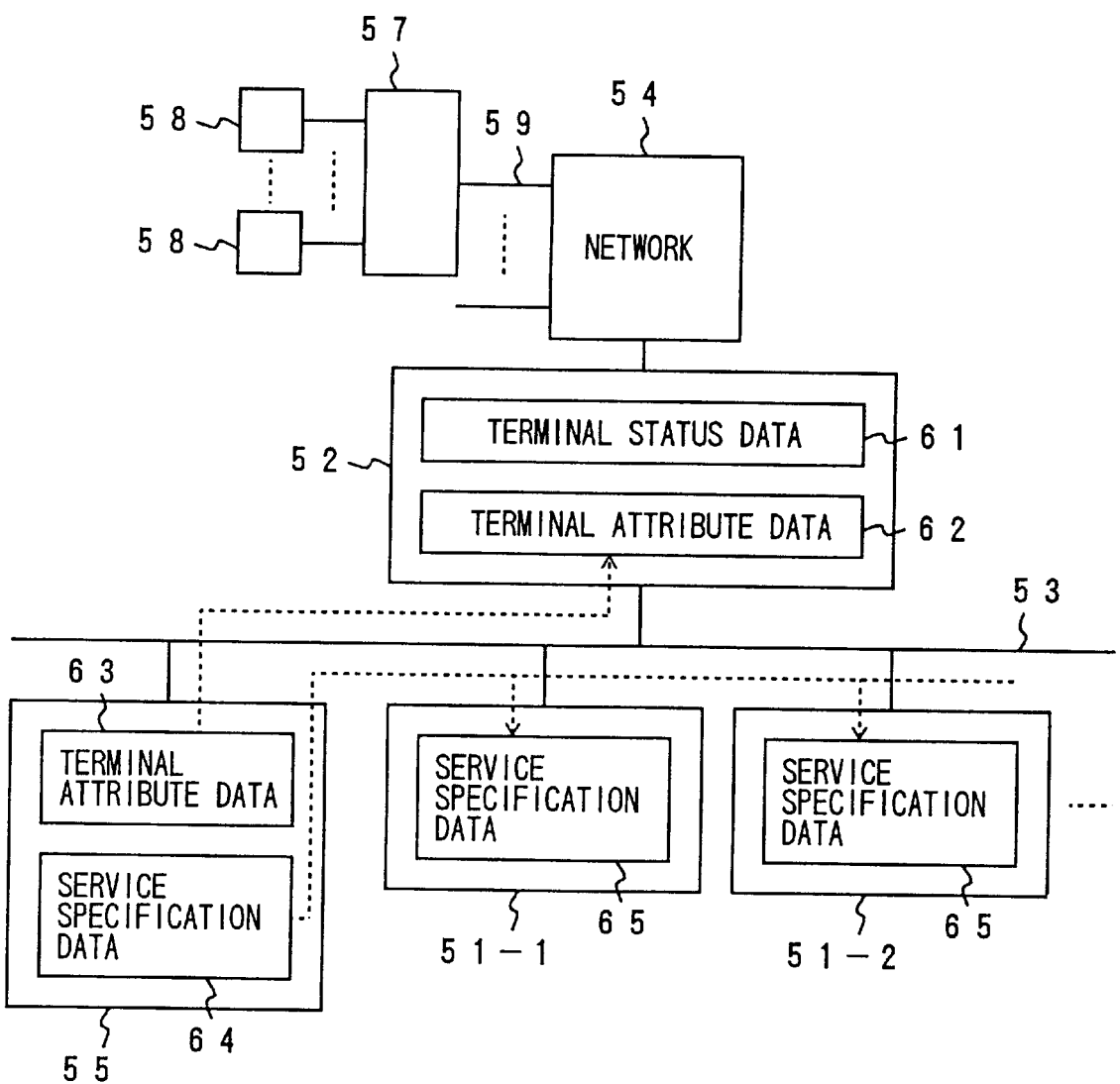
FIG. 38 shows how data are passed from an active processor to a standby processor according to a distributed processing system of the present invention.

FIG. 38 shows how data are passed from an active processor to a standby processor according to a distributed processing system of the present invention. In FIG. 38, those components that are identical to the corresponding components of FIG. 14 are designated by the same reference numerals. The system involves terminal data 61 indicating the status that varies as the call processing service for the terminal proceeds, terminal attribute data 62 provided at the time of the initial setting by being transferred from the operation and maintenance processor 55, terminal attribute data relating to the type of terminal maintained by the operation and maintenance processor 55 and to the call processing service available for the terminal, service specification data 64 maintained by the operation and maintenance processor 55, and service specification data 65 provided in the call processors 51-1, 51-2, . . . 51-n by being transferred thereto from the operation and maintenance processor 55 at the initial setting of the call processors.

When the initial setting of the network input/output device 52 is performed, the terminal attribute data held in the operation and maintenance data 63 is transferred over a path indicated by the broken line and set in the network input/output device 52. The network input/output device 52 manages the status of the terminals 58 belonging to the highways 59 in the form of the terminal status data 61, the call processors 51-1, 51-2, . . . 51-n being in charge of the respective highways 59.

When the initial setting of the call processors 51-1, 51-2, . . . 51-n is performed, the service specification data 64 held in the operation and maintenance processor 55 is transferred over a path indicated by the broken line to the call processors 51-1, 51-2, . . . 51-n and set therein. The service specification data in the operation and maintenance processor 55 and in the call processors 51-1, 51-2, . . . 51-n may be identical. Alternatively, only the data relating to the basic service may be retrieved from the service specification data 64 held in the operation and maintenance processor 55 and transferred to the call processors 51-1, 51-2, . . . 51-n to be held therein. The call processors 51-1, 51-2, . . . 51-n can then process calls in accordance with the service specification held therein.

As described before, the network input/output device 52 manages the status of the terminals 59 belonging to the respective highways 59 in the form of the terminal status data 61 and also manages the active processors being in charge of the highways 59 using the correspondence table 33 (see FIG. 5A). Therefore, when a fault occurs in an active processor so that a standby processor has to assume the charge of processes hitherto executed by the faulty processor, the standby processor receives a correspondence table status change report command from the network input/output device 52. Upon receipt of that command, the standby processor is capable of monitoring and controlling the terminals belonging to the highways that the faulty processor was taking charge of. The faulty processor may return to service when it recovers from the fault. The call processor switched from the active processor to the standby processor accordingly can immediately stop monitoring and controlling the terminals belonging to the target highways.

Thus, it is not necessary to provide extra measures to transfer management data from the active processor to the standby processor in the event of a processor installation, a processor uninstallation, an occurrence of a processor fault, a recovery from a processor fault, a highway installation, a highway uninstallation, an occurrence of a highway fault or a recovery from a highway fault.

Figure 39:
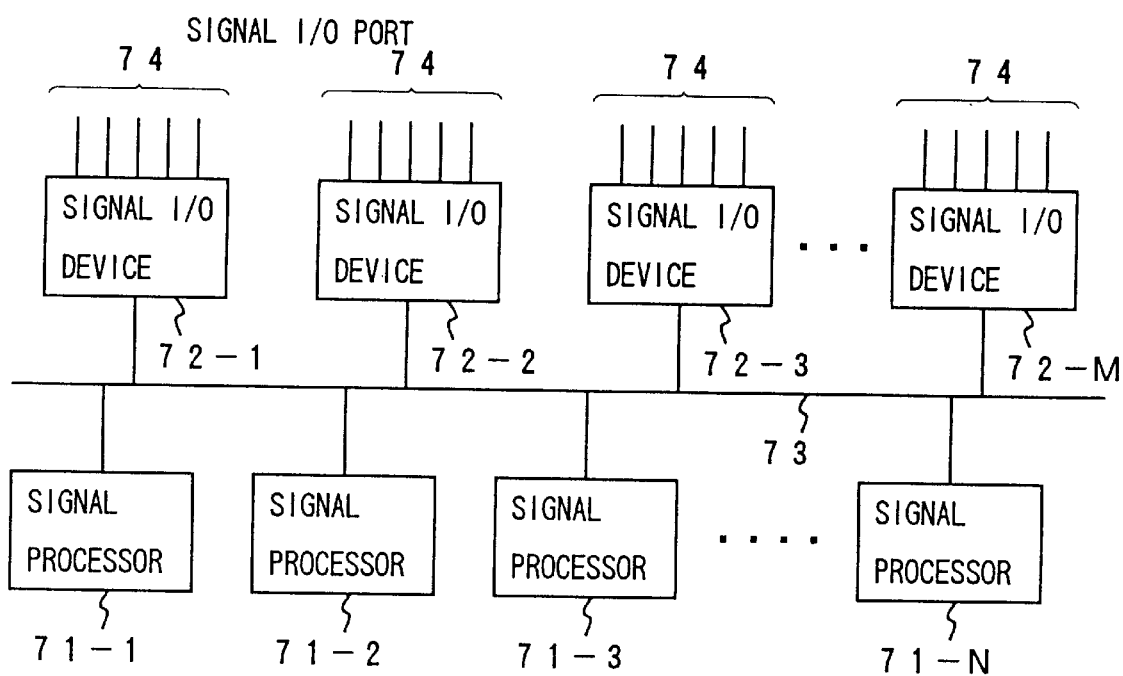
FIG. 39 shows another distributed processing system according to the present invention.

FIG. 39 shows another distributed processing system according to the present invention. The system includes signal processors 71-1–71-N, signal input/output devices 72-1–72-M, a bus 73 and signal input/output ports 74. Each of the signal input/output devices 72-1–72-M is provided for transfer control of data transferred between the input/output ports and accommodates a plurality of signal input/output ports such as highways. The signal processors 71-1–71-N performs distributed processing of requests from the signal input/output ports.

The signal input/output devices 72-1–72-M are multiplex transmission devices for the signal input/output ports 74 by providing for data multiplexing and demultiplexing, and connection between the input/output ports according to a multiplex system. The input/output devices 72-1–72-M distributes requests with respect to the signal input/output ports 74 among the signal processors 71-1–71-N, based on the status table for the signal input/output ports 74, the status table for the signal processors 71-1–71-N and the correspondence table specifying active and standby processors assigned to the signal input/output ports. Even in the event of an installation or an uninstallation of a signal processor or an input/output port, or in the event of a failure or a recovery from a failure in a signal processor or an input/output port, the signal processors can continue to perform distributed processing of input/output port requests as a result of an active/standby switching.

Figure 40:
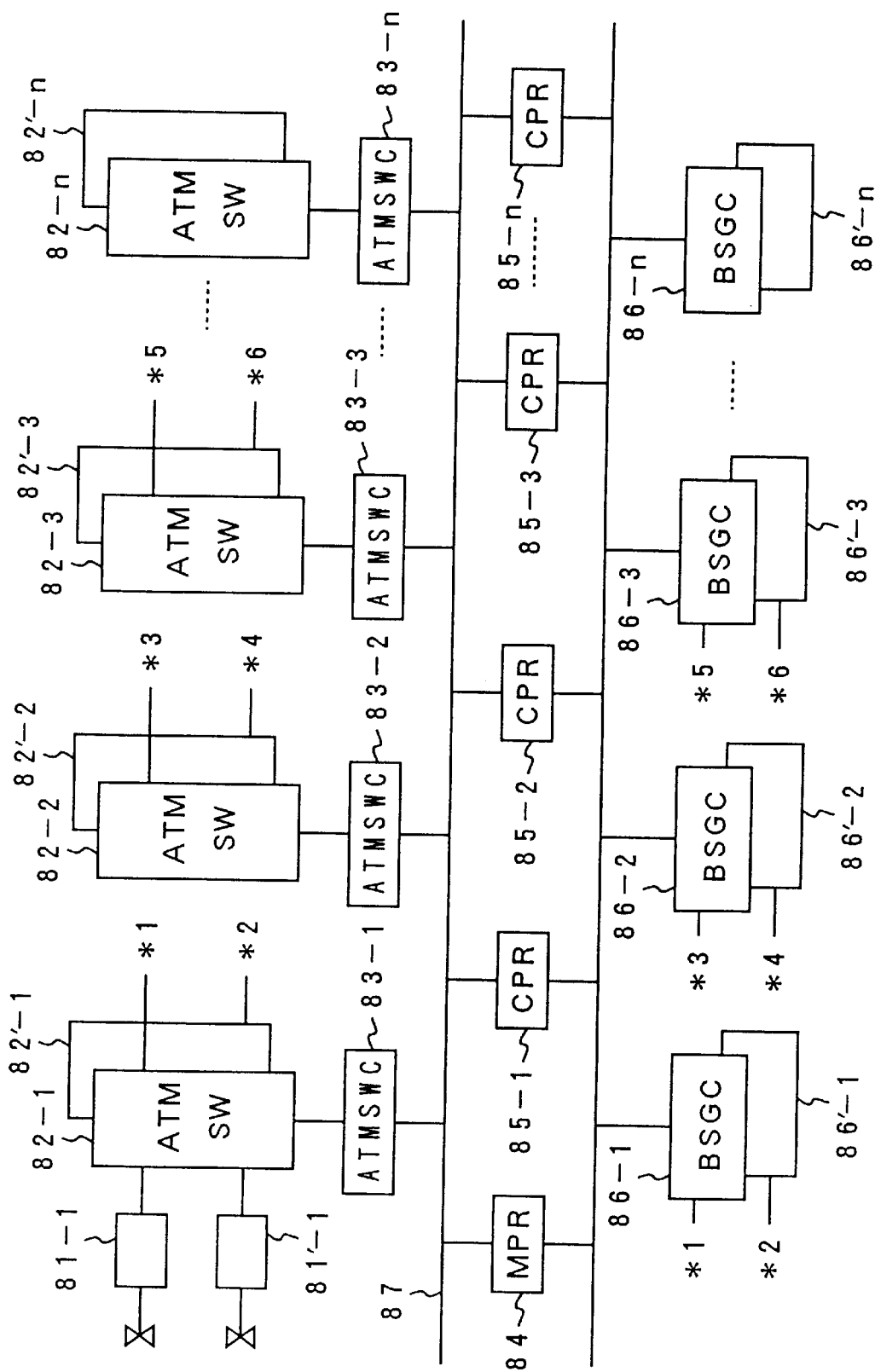
FIG. 40 is a schematic diagram showing an ATM switching system to which the present invention is applied.

FIG. 40 is a schematic drawing of an ATM switching system to which the present invention is applied.

Referring to FIG. 40, A plurality of ATM switches 82-1–82-n are connected to a bus 87 via a plurality of ATM switch controllers (ATMSWC) 83-1–83-n, respectively. A plurality of additional ATM switches are also connected to the bus 87 via the broadband main processors 83-1–83-n so as to constitute a duplex system. The ATM switch controllers control the entire system including the ATM switches. A plurality of broadband signaling controllers (BSGC) 86-1–86-n and a plurality of additional broadband signaling controllers 86'-1–86'-N are connected to a bus 88 so as to constitute a duplex broadband system. A plurality of call processors 85-1–85-n for setting up and releasing an SVC call by controlling a broadband signaling controller are connected to the buses 87 and 88. Also connected to the buses 87 and 88 is a main processor (MPR) 84. Line interface units 81-1 and 81'-1 each accommodates a plurality of circuits. Although not shown, the ATM switches 82-2–82-n and the additional ATM switches 82'-2–82'-n are also coupled to respective line interfaces. An ATM switch controller and a broadband signalling controller constitute an input/output device.

In the ATM switching system shown in FIG. 40, the call processors 85-1–85-n are not fixedly coupled to the ATM switches 82-1–82-n. More specifically, each call process is allowed to access any one of the ATM switches connected to the bus according to the distribution scheme described in the foregoing. Further, the call processors are also not fixedly coupled to the broadband signaling controllers 86-1–836-n.

Since the distribution scheme of the present invention is applied to the ATM switching system of FIG. 40, any excessive load imposed on the call processor 85-1, for example, is promptly shifted to another all processor connected to the same bus. It is to be noted that the main processor (MPR) 84 is only responsible for the operation and maintenance of the entire system and does not control the distribution of processes to call processors.

The present invention is not limited to the above described embodiments, and may be applied to any multi-processor information processing apparatus and distributed load processing.

What is claimed is:

1. An information processing apparatus comprising:

at least one input and output device having a plurality of input and output ports; and a plurality of processors, connected to at least one of said plurality of said input and output ports via a bus, for processing requests for processes requiring a use of said input and output ports in a distributed manner, said at least one input and output device comprising:

input and output port status management means for maintaining an input and output port status table listing a status of each of said plurality of input and output ports;

processor status management means for maintaining a processor status table listing a status of each of said plurality of processors; and correspondence table management means for managing correspondence between said plurality of input and output ports and pairs of active and standby processors, using a correspondence table and each of said plurality of processors comprising:

processor-specific input and output port status management means for maintaining a processor-specific input and output port status management table listing the status of each of said plurality of input and output ports to which a processor is assigned.

2. An information processing apparatus as claimed in claim 1, wherein said input and output port status table specifies one of different status conditions applicable to each of said input and output ports, said different status conditions including an "uninstalled" status, a "being installed" status, a "being uninstalled" status, a "being used in an active system" status, a "fault" status and a "blocked" status.

3. The information processing apparatus as claimed in claim 2, wherein said plurality of processors are call processors in an electronic switching system.

4. The information processing apparatus as claimed in claim 2, wherein said plurality of processors are call processors in an ATM switching system.

5. An information processing apparatus as claimed in claim 1, wherein said processor status table includes:

a processor status indication entry specifying one of different status conditions for each of said processors, said different status conditions including an "uninstalled" status, a "being installed" status, a "normally operating" status, a "fault" status;

an active input and output port count entry specifying a number of said input and output ports that a processor is in charge of as an active processor;

a standby input and output port count entry specifying a number of said input and output ports that a processor is in charge of as a standby processor; and a maximum input and output port count entry specifying a maximum number of said input and output ports controllable by a processor as an active processor.

6. The information processing apparatus as claimed in claim 5, wherein said plurality of processors are call processors in an electronic switching system.

7. The information processing apparatus as claimed in claim 5, wherein said plurality of processors are call processors in an ATM switching system.

8. An information processing apparatus as claimed in claim 1, wherein said correspondence table lists correspondences between said plurality of input and output ports and pairs of active and standby processors.

9. The information processing apparatus as claimed in claim 8, wherein said plurality of processors are call processors in an electronic switching system.

10. The information processing apparatus as claimed in claim 8, wherein said plurality of processors are call processors in an ATM switching system.

11. An information processing apparatus as claimed in claim 1, wherein said processor-specific input and output port status table of a processor specifies different status conditions that each of said plurality of input and output ports may assume with respect to the processor, said different status conditions being:

a) the input and output port is uninstalled;
b) the processor is not in charge of the input and output port;
c) the processor is in charge of the input and output port as an active processor;
d) the processor is in charge of the input and output port as a standby processor;
e) the processor is in charge of the input and output port as an active processor and the input and output port is in one of a fault state and a blocked state; and
f) the processor is in charge of the input and output port as a standby processor and the input and output port is in one of a fault state and a blocked state.

12. The information processing apparatus as claimed in claim 11, wherein said plurality of processors are call processors in an electronic switching system.

13. The information processing apparatus as claimed in claim 11, wherein said plurality of processors are call processors in an ATM switching system.

14. An information processing apparatus as claimed in claim 1, wherein each of said plurality of processors comprises processor status report means editing a status of the processor and sending the status to said at least one input and output device.

15. The information processing apparatus as claimed in claim 14, wherein said plurality of processors are call processors in an electronic switching system.

16. The information processing apparatus as claimed in claim 14, wherein said plurality of processors are call processors in an ATM switching system.

17. The information processing apparatus as claimed in claim 1, wherein said plurality of processors are call processors in an electronic switching system.

18. The information processing apparatus as claimed in claim 1, wherein said plurality of processors are call processors in an ATM switching system.

19. A distributed processing control method for use in an information processing apparatus comprising at least one input and output device having a plurality of input and output ports, and a plurality of processors connected to said at least one input and output device via a bus, said at least one input and output device comprises:
input and output port status management means for maintaining an input and output port status table listing status conditions of said plurality of input and output ports;
processor status management means for maintaining a processor status table listing status conditions of said plurality of processors; and
correspondence table management means for managing correspondence between said plurality of input and output ports and pairs of active and standby processors, and
each of said plurality of processors comprising:
processor-specific input and output port status management means for maintaining a processor-specific input and output port status management table listing status conditions of said plurality of input and output ports to which a processor is assigned,
said distributed control method comprising the steps of:
a) receiving a request for a process requiring a use of one of said plurality of input and output ports;
b) determining an active processor for the input and output port requested by referring to said correspondence table; and
c) causing the active processor determined in step b) to process the requested process.

20. A distributed processing control method as claimed in claim 19, updating, in the event of one of a fault and a blocking occurring in the active processor, said correspondence table such that said one of the faulty and the blocked active processor converts into a standby processor and a processor previously operating as a standby processor converts into an active processor for processing the request for the process requiring the use of the input and output port.

21. The distributed processing control method as claimed in claim 20, wherein said plurality of processors are call processors in an electronic switching system.

22. The distributed processing control method as claimed in claim 20, wherein said plurality of processors are call processors in an ATM switching system.

23. A distributed processing control method as claimed in claim 19, wherein said at least one input and output device monitors a processor status change report command periodically transmitted by each of said plurality of processors, determining that the processor is faulty when the processor status change report command fails to be received a predetermined number of times, and determining that the processor has recovered from a fault when the processor status change report command is received a predetermined number of times after an occurrence of the fault.

24. The distributed processing control method as claimed in claim 23, wherein said plurality of processors are call processors in an electronic switching system.

25. The distributed processing control method as claimed in claim 23, wherein said plurality of processors are call processors in an ATM switching system.

26. A distributed processing control method as claimed in claim 19, wherein, in the event of one of an installation and an uninstallation of a processor, said correspondence table is updated so that a number of input and output ports that the processors are in charge of as an active processor is level and the number of input and output ports that the processors are in charge of as a standby processor is level, by referring to the processor status table specifying the number of input and output ports that each processor is currently in charge of as an active processor and as a standby processor.

27. The distributed processing control method as claimed in claim 26, wherein said plurality of processors are call processors in an electronic switching system.

28. The distributed processing control method as claimed in claim 26, wherein said plurality of processors are call processors in an ATM switching system.

29. A distributed processing control method as claimed in claim 19, wherein each of said plurality of processors periodically reports a maximum number of input and output ports controllable by the processor, and, in the event of an overload occurring as a result of the input and output device causing a processor to control more than the maximum number of input and output ports, a switching between an active processor and a standby processors occurs so that the number of input and output ports that the overloaded processor is in charge of is less than the maximum number.

30. The distributed processing control method as claimed in claim 29, wherein said plurality of processors are call processors in an electronic switching system.

31. The distributed processing control method as claimed in claim 29, wherein said plurality of processors are call processors in an ATM switching system.

32. A distributed processing control method as claimed in claim 19, wherein, in the event of an installation, an uninstallation, a fault, and a recovery from a fault in an input and output port, the input and output port status table is updated, and, further, said correspondence table is updated so that the number of input and output ports that the processors are in charge of as an active processor is level, said events being reported to the processors using an input and output status change report command.

33. The distributed processing control method as claimed in claim 32, wherein said plurality of processors are call processors in an electronic switching system.

34. The distributed processing control method as claimed in claim 32, wherein said plurality of processors are call processors in an ATM switching system.

35. The distributed processing control method as claimed in claim 19, wherein said plurality of processors are call processors in an electronic switching system.

36. The distributed processing control method as claimed in claim 19, wherein said plurality of processors are call processors in an ATM switching system.

* * * * *